US 12,038,317 B2

(12) United States Patent
Cunningham et al.

(10) Patent No.: US 12,038,317 B2
(45) Date of Patent: Jul. 16, 2024

(54) VIBRATORY FLOWMETER AND METHODS AND DIAGNOSTICS FOR METER VERIFICATION

(71) Applicant: Micro Motion, Inc., Boulder, CO (US)

(72) Inventors: Timothy J. Cunningham, Boulder, CO (US); David J. Kapolnek, Broomfield, CO (US); Matthew J. Rensing, Cincinnati, OH (US); Christopher George Larsen, Cincinnati, OH (US)

(73) Assignee: Micro Motion, Inc., Boulder, CO (US)

( * ) Notice: Subject to any disclaimer, the term of this patent is extended or adjusted under 35 U.S.C. 154(b) by 102 days.

(21) Appl. No.: 17/883,797

(22) Filed: Aug. 9, 2022

(65) Prior Publication Data

US 2022/0390267 A1 Dec. 8, 2022

Related U.S. Application Data

(62) Division of application No. 17/106,844, filed on Nov. 30, 2020, now Pat. No. 11,473,961, which is a division of application No. 15/108,627, filed as application No. PCT/US2014/071558 on Dec. 19, 2014, now Pat. No. 10,890,479.

(60) Provisional application No. 61/931,421, filed on Jan. 24, 2014.

(51) Int. Cl.
*G01F 25/10* (2022.01)
*G01F 1/84* (2006.01)

(52) U.S. Cl.
CPC .............. *G01F 25/10* (2022.01); *G01F 1/84* (2013.01); *G01F 1/8436* (2013.01)

(58) Field of Classification Search
None
See application file for complete search history.

(56) References Cited

U.S. PATENT DOCUMENTS

| 6,092,429 A | 7/2000 | Cunningham et al. |
| 6,327,915 B1 | 12/2001 | Van Cleve et al. |
| 7,599,807 B2 | 10/2009 | Tombs |

(Continued)

FOREIGN PATENT DOCUMENTS

| DE | 102007061690 A1 | 6/2008 |
| JP | 2011169797 A | 9/2011 |

(Continued)

*Primary Examiner* — Brent A. Fairbanks
(74) *Attorney, Agent, or Firm* — The Ollila Law Group LLC

(57) ABSTRACT

A vibratory flowmeter (5) for meter verification is provided, including meter electronics (20) coupled to the first and second pickoff sensors (170L, 170R) and coupled to a driver (180), with the meter electronics (20) configured to: vibrate the flowmeter assembly (10) in a single mode using the driver (180), determine a single mode current (230) of the driver (180) and determine first and second response voltages (231) generated by the first and second pickoff sensors (170L, 170R), respectively, compute frequency response functions for the determined first and second response voltages (231) from the determined single mode current (230), fit the generated frequency response functions to a pole-residue model, and verify proper operation of the vibratory flowmeter (5) using the meter stiffness value (216), residual flexibility (218), and the meter mass (240) in embodiments.

18 Claims, 13 Drawing Sheets

(56) References Cited

U.S. PATENT DOCUMENTS

| | | |
|---|---|---|
| 7,660,681 B2 | 2/2010 | Tombs |
| 2001/0039841 A1 | 11/2001 | Van Cleve et al. |
| 2003/0055580 A1 | 3/2003 | Normen |
| 2003/0233860 A1* | 12/2003 | Deane ............... G01F 1/668 73/1.16 |
| 2004/0015282 A1 | 1/2004 | Babala et al. |
| 2007/0017274 A1* | 1/2007 | Wheeler ............. G01F 25/10 73/1.16 |
| 2008/0011100 A1 | 1/2008 | Sharp et al. |
| 2008/0234949 A1 | 9/2008 | Stack |
| 2008/0281535 A1* | 11/2008 | Rensing ............ G01F 1/8413 702/56 |
| 2009/0075129 A1 | 3/2009 | Sparks et al. |
| 2010/0011882 A1 | 1/2010 | Gebhardt et al. |
| 2010/0138117 A1 | 6/2010 | Witte |
| 2011/0196624 A1* | 8/2011 | Hackett, III ......... G01F 15/068 702/45 |
| 2012/0239312 A1 | 9/2012 | Tombs |
| 2012/0255370 A1 | 10/2012 | Rieder et al. |
| 2013/0304411 A1 | 11/2013 | Berndt et al. |
| 2014/0330439 A1 | 11/2014 | Cunningham et al. |

FOREIGN PATENT DOCUMENTS

| | | |
|---|---|---|
| KR | 1020010072277 | 7/2001 |
| SG | 11201510091 S | 1/2016 |
| WO | 9928708 A1 | 6/1999 |
| WO | 9944018 A1 | 9/1999 |
| WO | 2000008423 A1 | 2/2000 |
| WO | 0102815 A1 | 1/2001 |
| WO | 2007040468 A1 | 4/2007 |
| WO | 2007040542 A1 | 4/2007 |
| WO | 2013105933 A1 | 4/2007 |
| WO | 2010138117 A1 | 12/2010 |
| WO | 2014200672 A1 | 12/2014 |

* cited by examiner

METER ELECTRONICS 20

PROCESSING SYSTEM 203

STORAGE SYSTEM 204

| | | | |
|---|---|---|---|
| OPERATIONAL ROUTINE | 210 | MASS | 240 |
| VERIFICATION ROUTINE | 213 | BASELINE METER MASS | 241 |
| METER STIFFNESS | 216 | METER MASS RANGE | 242 |
| BASELINE METER STIFFNESS | 209 | BASELINE METER MASS DIFFERENCE | 245 |
| STIFFNESS RANGE | 219 | METER MASS DIFFERENCE RANGE | 246 |
| EXPECTED STIFFNESS | 217 | EXPECTED MASS DEVIATION | 250 |
| BASELINE METER STIFFNESS DIFFERENCE | 224 | BASELINE EXPECTED MASS DEVIATION | 251 |
| STIFFNESS DIFFERENCE RANGE | 225 | EXPECTED MASS DEVIATION RANGE | 252 |
| RESIDUAL FLEXIBILITY | 218 | BASELINE EXPECTED MASS DEVIATION DIFFERENCE | 255 |
| BASELINE RESIDUAL FLEXIBILITY | 220 | EXPECTED MASS DEVIATION DIFFERENCE RANGE | 256 |
| RESIDUAL FLEXIBILITY RANGE | 221 | DENSITY | 260 |
| BASELINE RESIDUAL FLEXIBILITY DIFFERENCE | 226 | DAMPING | 270 |
| RESIDUAL FLEXIBILITY DIFFERENCE RANGE | 227 | VIBRATIONAL RESPONSE | 208 |
| SINGLE MODE CURRENT | 230 | SINGLE MODE RESPONSE VOLTAGES | 231 |

INTERFACE 201

FIG.2

VIBRATORY FLOWMETER AND METHODS AND DIAGNOSTICS FOR METER VERIFICATION

CROSS-REFERENCE TO RELATED APPLICATIONS

This is a divisional application of U.S. application Ser. No. 17/106,844, filed on Nov. 30, 2020, entitled "VIBRATORY FLOWMETER AND METHODS AND DIAGNOSTICS FOR METER VERIFICATION" which is a divisional application of U.S. application Ser. No. 15/108,627 filed on Jun. 28, 2016, entitled "VIBRATORY FLOWMETER AND METHODS AND DIAGNOSTICS FOR METER VERIFICATION", now U.S. Pat. No. 10,890,479, issued Jan. 12, 2021, which is a National Stage application of International Application no. PCT/US2014/071558, filed Dec. 19, 2014, which claims benefit of U.S. provisional application No. 61/931,421, filed Jan. 24, 2014.

TECHNICAL FIELD

The present invention relates to meter electronics, and more particularly, to methods and diagnostics for meter verification in vibratory flowmeters.

STATEMENT OF THE PROBLEM

Vibrating conduit sensors, such as Coriolis mass flow meters or vibrating tube densitometers, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness, and damping characteristics of the containing conduit and the material contained therein.

A conduit of a vibratory flow meter can include one or more flow tubes. A flow tube is forced to vibrate at a resonant frequency, where the resonant frequency of the tube is proportional to the density of the fluid in the flow tube. Sensors located on the inlet and outlet sections of the tube measure the relative vibration between the ends of the tube. During flow, the vibrating tube and the flowing mass couple together due to Coriolis forces, causing a phase shift in the vibration between the ends of the tube. The phase shift is directly proportional to the mass flow.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling. The instrumentation receives signals from the two pickoff sensors and processes the signals in order to derive a mass flow rate measurement.

The phase difference between the two sensor signals is related to the mass flow rate of the material flowing through the flow tube or flow tubes. The mass flow rate of the material is proportional to the time delay between the two sensor signals, and the mass flow rate can therefore be determined by multiplying the time delay by a Flow Calibration Factor (FCF), where the time delay comprises a phase difference divided by frequency. The FCF reflects the material properties and cross-sectional properties of the flow tube. In the prior art, the FCF is determined by a calibration process prior to installation of the flow meter into a pipeline or other conduit. In the calibration process, a fluid is passed through the flow tube at a given flow rate and the proportionality constant (FCF) between the phase difference or time delay and the flow rate is calculated.

One advantage of a Coriolis flow meter is that the accuracy of the measured mass flow rate is not affected by wear of moving components in the flow meter. The flow rate is determined by multiplying the phase difference or time delay between two points of the flow tube and the flow calibration factor. The only input is the sinusoidal signals from the sensors, indicating the oscillation of two points on the flow tube. The phase difference is calculated from these sinusoidal signals. There are no moving components in the vibrating flow tube. Therefore, the measurement of the phase difference and the flow calibration factor are not affected by wear of moving components in the flow meter.

It is a problem that the flowtubes may change with time, wherein an initial factory calibration may change over time as the flowtubes are corroded, eroded, or otherwise changed. As a consequence, the flowtube stiffness may change from an initial representative stiffness value (or original measured stiffness value) over the life of the vibratory flowmeter.

A mass flow rate measurement ($\dot{m}$) can be generated according to the equation:

$$\dot{m} = FCF * [\Delta t - \Delta t_0] \qquad (1)$$

The ($\Delta t$) term comprises an operationally-derived (i.e., measured) time delay value comprising the time delay existing between the pickoff sensor signals, such as where the time delay is due to Coriolis effects related to mass flow rate through the vibratory flowmeter 5. The measured ($\Delta t$) term ultimately determines the mass flow rate of the flow material as it flows through the vibratory flowmeter 5. The ($\Delta t_0$) term comprises a time delay at zero flow calibration constant. The ($\Delta t_0$) term is typically determined at the factory and programmed into the vibratory flowmeter 5. The time delay at zero flow ($\Delta t_0$) term will not change, even where flow conditions are changing. The FCF term is proportional to the stiffness of the flow meter. The (FCF) term comprises a Flow Calibration Factor and typically comprises a geometric constant (G), Young's Modulus (E), and a moment of inertia (I), wherein:

$$FCF = G * E * I \qquad (2)$$

The geometric constant (G) for the vibratory flowmeter is fixed and does not change. The Young's Modulus constant (E) likewise does not change. In contrast, the moment of inertia (I) is the component of the FCF that may change.

Coriolis mass flow meters have received great success in a wide variety of industries. However, Coriolis flow meters along with most other flow meters can suffer from an accumulation of deposits left by the process fluid. This accumulation is generally referred to in the art as "coating." Depending on the characteristics of the process fluid, the fluid coating may or may not affect the flow meter's performance and accuracy. For example, the coating may have a different density than the process fluid. This can adversely affect the density reading obtained from the flow meter. With certain process fluids, the coating may build up inside the flow meter to a certain thickness and then break off as small flakes. These small flakes may affect other parts of the process connected to the flow meter. In extreme circumstances, the coating may build up enough such that the flow meter becomes plugged requiring complete shut down or in some circumstances, a complete replacement of the flow meter.

Other problems may be caused by coating, plugging, inconsistent process fluid compositions, changes in temperature of the process fluid, etc. For example, in the paint industry, the same flowmeter may be used for multiple paint colors. Therefore, even though the coating may not cause meter reading errors, the coating could adversely affect the end product.

Because of the above problems, along with others caused by coating, it is desirable to diagnose when there is flowmeter coating. Prior art diagnostic methods of detecting flow meter coating have a number of problems. Limitations of the prior art arise in situations where the density of the coating is substantially similar to the process fluid. In those circumstances density based coating detection is not available. Furthermore, in applications where it is known that the process fluid coats the flow meter, it is desirable during cleaning of the flow meter to be able to detect when the meter is completely uncoated.

Accordingly, there is a need in the art for advanced meter verification including diagnostics for coating detection that overcomes the above-mentioned limitations. Further, there is a need for advanced flow meter verification including diagnostics that may easily confirm to an operator whether erosion, corrosion, or other meter damage has occurred to particular flow meters and whether there may be flow measurement error due to such erosion, corrosion, or other flowtube damage.

Moreover, there is a need in the art for improving the detectability of flow calibration factor change and minimizing the possibility of false alarms through better meter verification and diagnostics.

SUMMARY OF THE INVENTION

The present invention overcomes the problems outlined above and advances the art by providing meter electronics for meter verification including diagnostics. Advantageously, the present invention allows for verification diagnostic parameters providing a "go/no go result" with respect to the problems associated with coating, erosion, corrosion, and other meter damage.

Moreover, the present invention advances the art through robust detectability of flow calibration factor change and minimizing the possibility of false alarms through better meter verification and diagnostics.

ASPECTS OF THE INVENTION

In one aspect of the invention, a vibratory flowmeter for meter verification comprises: a flowmeter assembly including one or more flowtubes and first and second pickoff sensors; a driver configured to vibrate the one or more flowtubes; and meter electronics coupled to the first and second pickoff sensors and coupled to the driver, with the meter electronics being configured to: vibrate the flowmeter assembly in a single mode using the driver, determine a single mode current of the driver and determine first and second response voltages generated by the first and second pickoff sensors, respectively, compute frequency response functions for the determined first and second response voltages from the determined single mode current, fit the generated frequency response functions to a pole-residue model to compute a meter mass value, and verify proper operation of the vibratory flowmeter using the meter mass value.

Preferably, the meter electronics being further configured to compute a difference of meter mass values at the first and second pickoff sensors, and verify proper operation of the vibratory flowmeter using the computed difference of the meter mass values.

Preferably, the verify operation of the vibratory flowmeter using the computed difference of the meter mass values includes: to determine a difference between the computed difference of the meter mass values and a baseline meter mass difference, and wherein the determined difference is compared to a predetermined mass difference range.

Preferably, the meter electronics being further configured to compare the computed difference of the meter mass values to a predetermined mass difference range, generate a verification indication for the vibratory flowmeter if the computed difference of the meter mass values falls within the predetermined mass difference range, and generate a non-verification indication for the vibratory flowmeter if the computed difference of the meter mass values does not fall within the predetermined mass difference range.

Preferably, the meter electronics being further configured to utilize a fluid density to compute an expected mass deviation for the first and second pickoff sensors, and verify proper operation of the vibratory flowmeter using the expected mass deviation.

Preferably, the fluid density includes at least one of a measured fluid density and an inputted expected fluid density.

Preferably, the meter electronics being further configured to compute a difference of expected mass deviation values at the first and second pickoff sensors, and verify proper operation of the vibratory flowmeter using the computed difference of the expected mass deviation values.

Preferably, the verify operation of the vibratory flowmeter using the computed difference of the expected mass deviation values includes: to determine a difference between the computed difference of the expected mass deviation mass values and a baseline expected mass deviation difference, and wherein the determined difference is compared to a predetermined expected mass deviation difference range.

Preferably, the meter electronics being further configured to compare the computed difference of the expected mass deviation values to a predetermined expected mass deviation difference range, generate a verification indication for the vibratory flowmeter if the computed difference of the expected mass deviation values falls within the predetermined expected mass deviation difference range, and generate a non-verification indication for the vibratory flowmeter if the computed difference of the expected mass deviation values does not fall within the predetermined expected mass deviation difference range.

In one aspect of the invention, a meter verification method for a vibratory flowmeter, with the method comprising: vibrating a flowmeter assembly of the vibratory flowmeter in a single mode using a driver; determining a single mode current of the driver and determining first and second single mode response voltages generated by first and second pickoff sensors, respectively; computing frequency response functions for the determined first and second response voltages from the determined single mode current; fitting the generated frequency response functions to a pole-residue model to generate a meter mass value; and verifying proper operation of the vibratory flowmeter using the meter mass value.

Preferably, the meter electronics further comprising computing a difference of meter mass values at the first and second pickoff sensors, and verifying proper operation of the vibratory flowmeter using the computed difference of the meter mass values.

Preferably, wherein the verifying operation of the vibratory flowmeter using the computed difference of the meter mass values includes: determining a difference between the computed difference of the meter mass values and a baseline meter mass difference, and wherein the determined difference is compared to a predetermined mass difference range.

Preferably, the meter electronics further comprising: comparing the computed difference of the meter mass values to a predetermined mass difference range, generating a verification indication for the vibratory flowmeter if the computed difference of the meter mass values falls within the predetermined mass difference range, and generating a non-verification indication for the vibratory flowmeter if the computed difference of the meter mass values does not fall within the predetermined mass difference range.

Preferably, the meter electronics further comprising: utilizing a fluid density to compute an expected mass deviation for the first and second pickoff sensors, and verifying proper operation of the vibratory flowmeter using the expected mass deviation.

Preferably, wherein the fluid density includes at least one of a measured fluid density and an inputted expected fluid density.

Preferably, the meter electronics further comprising: computing a difference of expected mass deviation values at the first and second pickoff sensors, and verifying proper operation of the vibratory flowmeter using the computed difference of the expected mass deviation values.

Preferably, wherein the verifying operation of the vibratory flowmeter using the computed difference of the expected mass deviation values includes: determining a difference between the computed difference of the expected mass deviation mass values and a baseline expected mass deviation difference, and wherein the determined difference is compared to a predetermined expected mass deviation difference range.

Preferably, the meter electronics further comprising: comparing the computed difference of the expected mass deviation values to a predetermined expected mass deviation difference range, generating a verification indication for the vibratory flowmeter if the computed difference of the expected mass deviation values falls within the predetermined expected mass deviation difference range, and generating a non-verification indication for the vibratory flowmeter if the computed difference of the expected mass deviation values does not fall within the predetermined expected mass deviation difference range.

DESCRIPTION OF THE DRAWINGS

The same reference number represents the same element on all drawings. The drawings are not necessarily to scale.

FIG. 2 shows meter electronics for meter verification of the vibratory flowmeter according to an embodiment of the invention.

DETAILED DESCRIPTION OF THE INVENTION

FIGS. 1-18 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
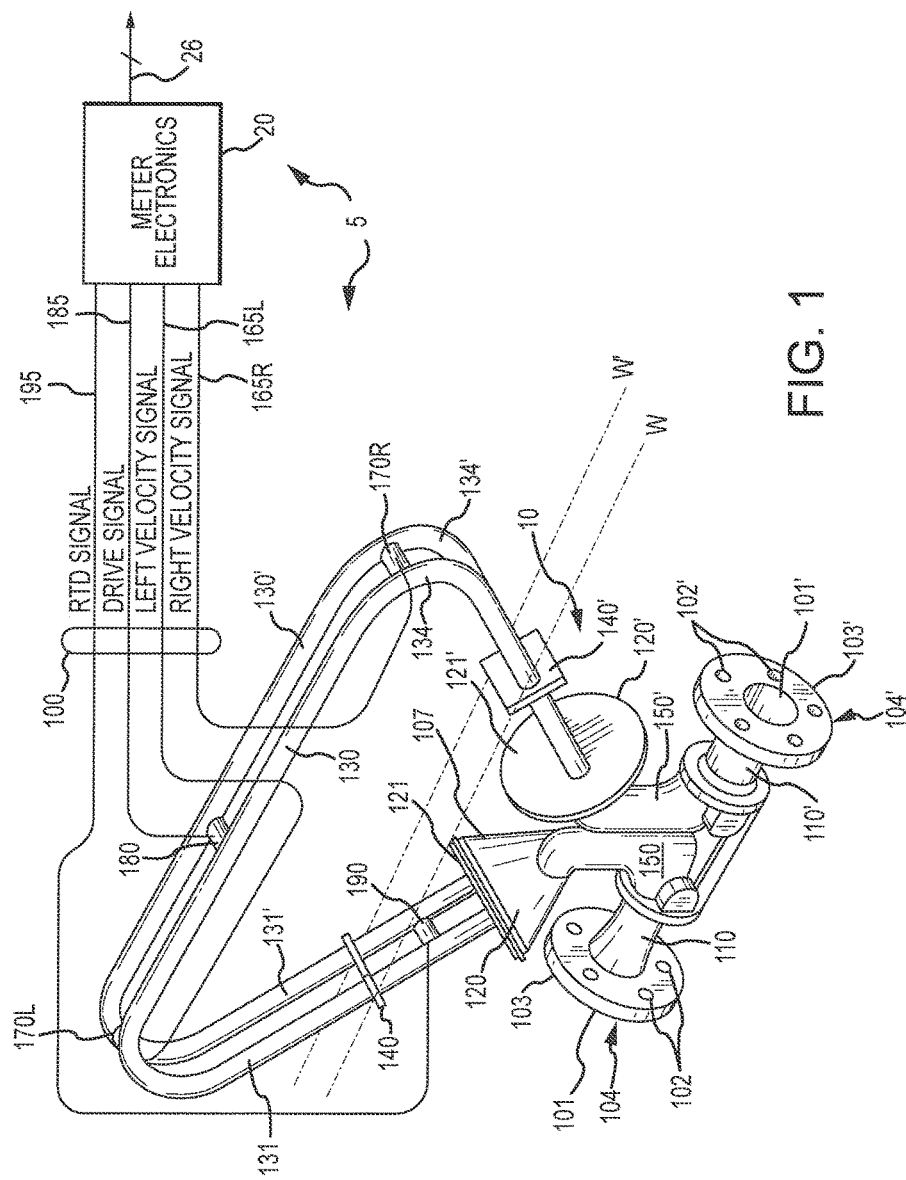
FIG. 1 shows a vibratory flowmeter for meter verification according to an embodiment of the invention.

FIG. 1 shows a flow meter 5 comprising a meter assembly 10 and meter electronics 20. Meter assembly 10 responds to mass flow rate and density of a process material. Meter electronics 20 is connected to meter assembly 10 via leads 100 to provide density, mass flow rate, and temperature information over path 26, as well as other information not relevant to the present invention. A Coriolis flow meter structure is described although it is apparent to those skilled in the art that the present invention could be practiced as a vibrating tube densitometer without the additional measurement capability provided by a Coriolis mass flow meter.

Meter assembly 10 includes a pair of manifolds 150 and 150', flanges 103 and 103' having flange necks 110 and 110', a pair of parallel flow tubes 130 and 130', drive mechanism 180, temperature sensor 190, and a pair of velocity sensors 170L and 170R. Flow tubes 130 and 130' have two essentially straight inlet legs 131 and 131' and outlet legs 134 and 134' which converge towards each other at flow tube mounting blocks 120 and 120'. Flow tubes 130 and 130' bend at two symmetrical locations along their length and are essentially parallel throughout their length. Brace bars 140 and 140' serve to define the axis W and W' about which each flow tube oscillates.

The side legs 131, 131' and 134, 134' of flow tubes 130 and 130' are fixedly attached to flow tube mounting blocks 120 and 120' and these blocks, in turn, are fixedly attached to manifolds 150 and 150'. This provides a continuous closed material path through Coriolis meter assembly 10.

When flanges 103 and 103', having holes 102 and 102' are connected, via inlet end 104 and outlet end 104' into a process line (not shown) which carries the process material that is being measured, material enters end 104 of the meter through an orifice 101 in flange 103 is conducted through manifold 150 to flow tube mounting block 120 having a surface 121. Within manifold 150 the material is divided and routed through flow tubes 130 and 130'. Upon exiting flow tubes 130 and 130', the process material is recombined in a single stream within manifold 150' and is thereafter routed to exit end 104' connected by flange 103' having bolt holes 102' to the process line (not shown).

Flow tubes 130 and 130' are selected and appropriately mounted to the flow tube mounting blocks 120 and 120' so as to have substantially the same mass distribution, moments of inertia and Young's modulus about bending axes W-W and W'-W', respectively. These bending axes go through brace bars 140 and 140'. Inasmuch as the Young's modulus of the flow tubes change with temperature, and this change affects the calculation of flow and density, resistive temperature detector (RTD) 190 is mounted to flow tube 130', to continuously measure the temperature of the flow tube. The temperature of the flow tube and hence the voltage appearing across the RTD for a given current passing therethrough is governed by the temperature of the material passing through the flow tube. The temperature dependent voltage appearing across the RTD is used in a well known method by meter electronics 20 to compensate for the change in elastic modulus of flow tubes 130 and 130' due to any changes in flow tube temperature. The RTD is connected to meter electronics 20 by lead 195.

Both flow tubes 130 and 130' are driven by driver 180 in opposite directions about their respective bending axes W and W' and at what is termed the first out-of-phase bending mode of the flow meter. This drive mechanism 180 may comprise any one of many well known arrangements, such as a magnet mounted to flow tube 130' and an opposing coil mounted to flow tube 130 and through which an alternating current is passed for vibrating both flow tubes. A suitable drive signal is applied by meter electronics 20, via lead 185, to drive mechanism 180.

Meter electronics 20 receives the RTD temperature signal on lead 195, and the left and right velocity signals appearing on leads 165L and 165R, respectively. Meter electronics 20 produces the drive signal appearing on lead 185 to drive element 180 and vibrate tubes 130 and 130'. Meter electronics 20 processes the left and right velocity signals and the RTD signal to compute the mass flow rate and the density of the material passing through meter assembly 10. This information, along with other information, is applied by meter electronics 20 over path 26 to utilization means.

FIG. 2 shows the meter electronics 20 according to an embodiment of the invention. The meter electronics 20 can include an interface 201 and a processing system 203. The meter electronics 20 receives a vibrational response 208, such as from the meter assembly 10, for example. The meter electronics 20 processes the vibrational response 208 in order to obtain flow characteristics of the flow material flowing through the meter assembly 10.

As previously discussed, the Flow Calibration Factor (FCF) reflects the material properties and cross-sectional properties of the flow tube. A mass flow rate of flow material flowing through the flow meter is determined by multiplying a measured time delay (or phase difference/frequency) by the FCF. The FCF can be related to a stiffness characteristic of the meter assembly. If the stiffness characteristic of the meter assembly changes, then the FCF will also change. Changes in the stiffness of the flow meter therefore will affect the accuracy of the flow measurements generated by the flow meter.

The interface 201 receives the vibrational response 208 from one of the velocity sensors 170L and 170R via the leads 100 of FIG. 1. The interface 201 can perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment is coupled with a digitizer (not shown), wherein the sensor signal comprises an analog sensor signal. The digitizer samples and digitizes an analog vibrational response and produces the digital vibrational response 208.

The processing system 203 conducts operations of the meter electronics 20 and processes flow measurements from the flow meter assembly 10. The processing system 203 executes one or more processing routines and thereby processes the flow measurements in order to produce one or more flow characteristics.

The processing system 203 can comprise a general purpose computer, a microprocessing system, a logic circuit, or some other general purpose or customized processing device. The processing system 203 can be distributed among multiple processing devices. The processing system 203 can include any manner of integral or independent electronic storage medium, such as the storage system 204.

The storage system 204 can store flow meter parameters and data, software routines, constant values, and variable values. In one embodiment, the storage system 204 includes routines that are executed by the processing system 203, such as the operational routine 210 and verification routine 213 of the flow meter 5.

The storage system 204 can store a meter stiffness value 216. The meter stiffness value 216 comprises a stiffness value that is determined from vibrational responses generated during operation of the vibratory flowmeter 5. The meter stiffness value 216 may be generated in order to verify proper operation of the vibratory flowmeter 5. The meter stiffness value 216 may be generated for a verification process, wherein the meter stiffness value 216 serves the purpose of verifying proper and accurate operation of the vibratory flowmeter 5.

The storage system 204 can store an expected stiffness value 217. The expected stiffness may be developed from the factory air and water baseline stiffnesses 209 and used to normalize the measured stiffness, removing any density dependence. The expected stiffness calculation is described in later paragraphs. The expected stiffness 217 may be generated in order to verify proper operation of the vibratory flowmeter 5.

The storage system 204 can store a single mode current 230. The single mode drive current 230 may comprise a drive/excitation current or currents used to generate the single vibration mode in the flowmeter assembly 5 as well as the meter verification signals. The single mode drive current 230 may comprise a current from the driver 180. The single mode current 230 may comprise a commanded current for the single vibration mode (i.e., the current stipulated for the driver 180) or can comprise a measured current of the single vibration mode (i.e., the current measured as actually flowing through the driver).

The storage system 204 can store a single mode response voltages 231. The primary mode response voltage 231 may comprise sinusoidal voltage signals or voltage levels generated in response to the vibration mode. The single mode response voltages 231 may comprise voltage signals or voltage levels (such as peak voltages) generated by one or both of the first and second pickoff sensors 170L and 170R. The response voltages will also include the responses at the meter verification excitation signal frequencies. In some embodiments, the storage system 204 can store a single mode response voltages 231 corresponding to the first and second pickoff sensors 170L and 170R.

The meter stiffness value 216 may be generated from the information or measurements generated during a single vibration mode.

The vibrational response of a flow meter can be represented by an open loop, second order drive model, comprising:

$$M\ddot{x} + C\dot{x} + Kx = f(t) \quad (3)$$

where f is the force applied to the system, M is a mass parameter of the system, C is a damping parameter, and K is a stiffness parameter. The term x is the physical displacement distance of the vibration, the term $\dot{x}$ is the velocity of the flowtube displacement, and the term $\ddot{x}$ is the acceleration. This is commonly referred to as the MCK model. This formula can be rearranged into the form:

$$(ms^2 + cs + k)X(s) = F(s) + (ms+c)x(0) + m\dot{x}(0) \quad (4)$$

Equation (4) can be further manipulated into a transfer function form, while ignoring the initial conditions. The result is:

$$H(s) = \frac{\text{output}}{\text{input}} = \frac{X(s)}{F(s)} = \frac{\frac{1}{m}}{s^2 + \frac{c}{m}s + \frac{k}{m}} \quad (5)$$

Further manipulation can transform equation (5) into a first order pole-residue frequency response function form, comprising:

$$H(\omega) = \frac{R}{(j\omega - \lambda)} + \frac{\overline{R}}{(j\omega - \overline{\lambda})} \quad (6)$$

where $\lambda$ is the pole, R is the residue, the term (j) comprises the square root of $-1$, and $\omega$ is the circular excitation frequency in radians per second.

The system parameters comprising the natural/resonant frequency ($\omega_n$), the damped natural frequency ($\omega_d$), and the decay characteristic ($\zeta$) are defined by the pole.

$$\omega_n = |\lambda| \quad (7)$$

$$\omega_d = imag(\lambda) \quad (8)$$

$$\zeta = \frac{\text{real}(\lambda)}{\omega_n} \quad (9)$$

The stiffness parameter (K), the damping parameter (C), and the mass parameter (M) of the system can be derived from the pole and residue.

$$M = \frac{1}{2jR\omega_d} \quad (10)$$

$$K = \omega_n^2 M \quad (11)$$

$$C = 2\zeta\omega_n M \quad (12)$$

Consequently, the stiffness parameter (K), the mass parameter (M), and the damping parameter (C) can be calculated based on a good estimate of the pole ($\lambda$) and the residue (R).

The pole and residue are estimated from the measured Frequency Response Functions (FRFs). The pole ($\lambda$) and the residue (R) can be estimated using an iterative computational method, for example.

The storage system 204 can store a baseline meter stiffness for air and water 209 that is programmed into the meter electronics 20. In some embodiments, the baseline meter stiffness for air and water 209 may be programmed into the meter electronics 20 at the factory (or other manufacturer facility), such as upon construction or sale of the vibratory flowmeter 5. Alternatively, the baseline meter stiffness for air and water 209 may be programmed into the meter electronics 20 during a field calibration operation or other calibration or re-calibration operation. However, it should be understood that the baseline meter stiffness for air and water 209 in most embodiments will not be changeable by a user or operator or during field operation of the vibratory flowmeter 5.

If the meter stiffness value 216 is substantially the same as the baseline meter stiffness 209, then it can be determined that the vibratory flowmeter 5 is relatively unchanged in condition from when it was manufactured, calibrated, or when the vibratory flowmeter 5 was last re-calibrated. Alternatively, where the meter stiffness value 216 significantly differs from the baseline meter stiffness 209, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

The storage system 204 can store a predetermined stiffness range 219. The predetermined stiffness range 219 comprises a selected range of acceptable stiffness values. The predetermined stiffness range 219 may be chosen to account for corrosion or erosion in the vibratory flowmeter 5.

In one embodiment, the storage system 204 stores a baseline meter stiffness difference 224. In some embodiments, the baseline meter stiffness difference 224 may be programmed into the meter electronics 20 at the factory (or other manufacturer facility), such as upon construction or sale of the vibratory flowmeter 5. Alternatively, the baseline meter stiffness difference 224 may be programmed into the meter electronics 20 during a field calibration operation or other calibration or re-calibration operation. However, it should be understood that the baseline meter stiffness difference 224 in most embodiments will not be changeable by a user or operator or during field operation of the vibratory flowmeter 5.

If the difference in meter stiffness values at first and second pick off sensors 170L and 170R is substantially the same as the baseline meter stiffness difference 224, then it can be determined that the vibratory flowmeter 5 is relatively unchanged in condition from when it was manufactured, calibrated, or when the vibratory flowmeter 5 was last re-calibrated. Alternatively, where the difference in meter stiffness values at first and second pick off sensors 170L and 170R significantly differs from the baseline meter stiffness difference 224, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined meter stiffness difference range 225. The predetermined meter stiffness difference range 225 comprises a selected range of acceptable meter stiffness difference values. The predetermined meter stiffness difference range 225 may be chosen to account for corrosion or erosion in the vibratory flowmeter 5.

In one embodiment, the storage system 204 stores a meter residual flexibility 218. The meter residual flexibility 218 comprises a residual flexibility value that is determined from vibrational responses generated during operation of the vibratory flowmeter 5. Determining the residual flexibility only requires additional curve fitting during the stiffness calculation, requiring only an additional iteration of the fitting algorithm or process for equation (16) in some embodiments.

Figure 3:
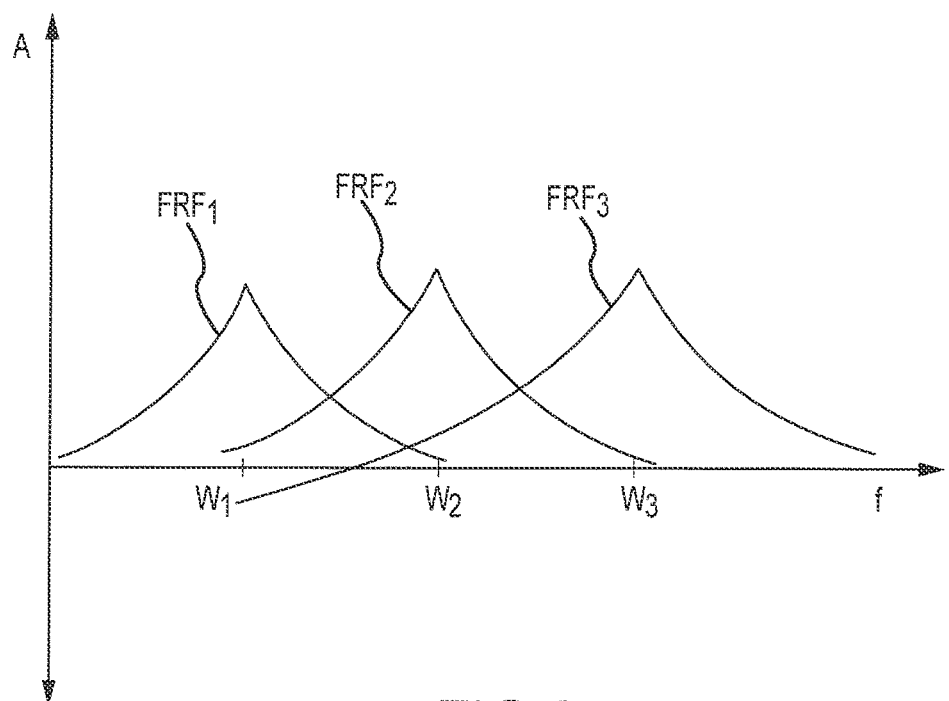
FIG. 3 is a graph of frequency response showing the effect of residual flexibility.

FIG. 3 is a graph of three FRFs showing the effect of residual flexibility, plotted as amplitude (A) versus frequency (f). The amplitude peak of $FRF_1$ occurs at the first resonance frequency $\omega_1$. The amplitude peaks $FRF_2$ and $FRF_3$ occur at the resonance frequencies $\omega_2$ and $\omega_3$. It can be seen from the graph that $FRF_2$ and $FRF_3$ have tails that affect the amplitude values of $FRF_1$, including at the resonance frequency $\omega_1$. This effect of the tails of $FRF_2$ and $FRF_3$ on the vibration at the resonance frequency $\omega_1$ is called residual flexibility. Similarly, $FRF_2$ shows the residual flexibility effect of the tail of $FRF_3$.

Note that in the preferred FRF measurement, two FRFs are measured for a particular drive frequency and vibrational response. One FRF measurement is obtained from the driver to the right pickoff (RPO) and one FRF measurement is obtained from the driver to the left pickoff (LPO). This approach is called single input, multiple output (SIMO). Recognizing that the two FRFs share a common pole ($\lambda$) but separate residues ($R_L$) and ($R_R$), the two measurements can be combined advantageously to result in a robust pole and residue determination.

$$\begin{bmatrix} 1 & 0 & \frac{\tilde{H}_{LPO}}{j\omega} \\ 0 & 1 & \frac{\tilde{H}_{RPO}}{j\omega} \end{bmatrix} \begin{Bmatrix} R_L \\ R_R \\ \lambda \end{Bmatrix} = \tilde{H} \tag{13}$$

Equation (13) can be solved in any number of ways. In one embodiment, the equation is solved through a recursive least squares approach. In another embodiment, the equation is solved through a pseudo-inverse technique. In yet another embodiment, because all of the measurements are available simultaneously, a standard Q-R decomposition technique can be used. The Q-R decomposition technique is discussed in Modern Control Theory, William Brogan, copyright 1991, Prentice Hall, pp. 222-224, 168-172.

Referring again to FIG. 2, the meter residual flexibility 218 may be generated in order to verify proper operation of the vibratory flowmeter 5. The meter residual flexibility 218 may be generated for a verification process, wherein the meter residual flexibility 218 serves the purpose of verifying proper and accurate operation of the vibratory flowmeter 5.

The pole-residue model can be modified to include a single residual flexibility term, $\Phi$, to account for the aggregate effect of the other modes. This effect is assumed to be constant with frequency within the local measurements near the drive mode. This will be true if all other modes are higher-frequency than the drive mode and are sufficiently far away to be treated as a pure stiffness. The modified pole-residue model is now known as the pole-residue residual flexibility model:

$$H(\omega) = \frac{R}{j\omega - \lambda} + \Phi \tag{14}$$

The model can be converted to a velocity FRF and the terms can be rearranged to obtain the more readily solvable form:

$$\tilde{H}(\omega) = \frac{j\omega R}{j\omega - \lambda} + j\omega\Phi \tag{15}$$

Equation 15 can be put into a form similar to equation 13, which is a form that is easily solved using techniques from linear algebra (the discussion following eq. 13).

$$\begin{bmatrix} 1 & 0 & \frac{\tilde{H}_{LPO}}{j\omega} & j\omega - \lambda & 0 \\ 0 & 1 & \frac{\tilde{H}_{RPO}}{j\omega} & 0 & j\omega - \lambda \end{bmatrix} \begin{Bmatrix} R_L \\ R_R \\ \lambda \\ \Phi_L \\ \Phi_R \end{Bmatrix} = \tilde{H} \tag{16}$$

The equation is no longer strictly linear in terms of the unknowns, R, $\lambda$, and $\Phi$. Rather, the $\Phi$ and $\lambda$ terms are interdependent. This can be handled via simple iterative solution technique. The model is first solved without residual flexibility terms (using equation 13) to get an initial pole estimate. This estimate is used to seed the initial iteration of equation 16. This approach works reasonably well because the pole estimate is fairly insensitive to the relatively small residual flexibility, much more so than the residues are. Since a new pole estimate is produced each time equation (16) is evaluated, the iterative technique can be repeated until the pole stabilizes (although a single iteration may be sufficient in practice). In an online implementation, where system parameters are computed for a number of sequential measurements in time, it may be more useful or efficient to seed the estimate of the pole with the value from the previous time window, rather than starting from scratch with the model without residual flexibility each time.

In one embodiment, the storage system 204 stores a baseline meter residual flexibility 220. In some embodiments, the baseline meter residual flexibility 220 may be programmed into the meter electronics 20 at the factory (or other manufacturer facility), such as upon construction or sale of the vibratory flowmeter 5. Alternatively, the baseline meter residual flexibility 220 may be programmed into the meter electronics 20 during a field calibration operation or other calibration or re-calibration operation. However, it should be understood that the baseline meter residual flexibility 220 in most embodiments will not be changeable by a user or operator or during field operation of the vibratory flowmeter 5.

If the residual flexibility 218 is substantially the same as the baseline meter residual flexibility 220, then it can be determined that the vibratory flowmeter 5 is relatively unchanged in condition from when it was manufactured, calibrated, or when the vibratory flowmeter 5 was last re-calibrated. Alternatively, where the residual flexibility 218 is significantly differs from the baseline meter residual flexibility 220, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined residual flexibility range 221. The predetermined residual flexibility range 221 comprises a selected range of acceptable residual flexibility values. The predetermined residual flexibility range 221 may be chosen to account for corrosion or erosion in the vibratory flowmeter 5.

In one embodiment, the storage system 204 stores a baseline meter residual flexibility difference 226. In some embodiments, the baseline meter residual flexibility difference 226 may be programmed into the meter electronics 20 at the factory (or other manufacturer facility), such as upon construction or sale of the vibratory flowmeter 5. Alternatively, the baseline meter residual flexibility difference 226 may be programmed into the meter electronics 20 during a field calibration operation or other calibration or re-calibration operation. However, it should be understood that the baseline meter residual flexibility difference 226 in most embodiments will not be changeable by a user or operator or during field operation of the vibratory flowmeter 5.

If the difference in residual flexibility values at first and second pick off sensors 170L and 170R is substantially the same as the baseline meter residual flexibility difference 226, then it can be determined that the vibratory flowmeter 5 is relatively unchanged in condition from when it was manufactured, calibrated, or when the vibratory flowmeter 5 was last re-calibrated. Alternatively, where the difference in residual flexibility values at first and second pick off sensors 170L and 170R significantly differs from the baseline meter residual flexibility difference 226, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined residual flexibility difference range 227. The predetermined residual flexibility difference range 227 comprises a selected range of acceptable residual flexibility difference values. The predetermined residual flexibility difference range 227 may be chosen to account for corrosion or erosion in the vibratory flowmeter 5.

The storage system 204 can store a meter mass value 240. The meter mass value 240 comprises a meter mass value that is determined from vibrational responses generated during operation of the vibratory flowmeter 5. The meter mass value 240 may be generated in order to verify proper operation of the vibratory flowmeter 5. The meter mass value 240 may be generated for a verification process, wherein the meter mass value 240 serves the purpose of verifying proper and accurate operation of the vibratory flowmeter 5.

In one embodiment, the storage system 204 stores a baseline mass value for air and water 241. In some embodiments, the baseline mass value for air and water 241 may be programmed into the meter electronics 20 at the factory (or other manufacturer facility), such as upon construction or sale of the vibratory flowmeter 5. Alternatively, the baseline mass value for air and water 241 may be programmed into the meter electronics 20 during a field calibration operation or other calibration or re-calibration operation. However, it should be understood that the baseline mass value for air and water 241 in most embodiments will not be changeable by a user or operator or during field operation of the vibratory flowmeter 5.

If the mass value 240 is substantially the same as the baseline mass value for air and water 241, then it can be determined that the vibratory flowmeter 5 is relatively unchanged in condition from when it was manufactured, calibrated, or when the vibratory flowmeter 5 was last re-calibrated. Alternatively, where the mass value 240 significantly differs from the baseline mass value for air and water 241, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined mass value range 242. The predetermined mass value range 242 comprises a selected range of acceptable mass values. The predetermined mass value range 242 may be chosen to account for corrosion or erosion in the vibratory flowmeter 5.

In one embodiment, the storage system 204 stores a baseline meter mass difference 245. In some embodiments, the baseline meter mass difference 245 may be programmed into the meter electronics 20 at the factory (or other manufacturer facility), such as upon construction or sale of the vibratory flowmeter 5. Alternatively, the baseline meter mass difference 245 may be programmed into the meter electronics 20 during a field calibration operation or other calibration or re-calibration operation. However, it should be understood that the baseline meter mass difference 245 in most embodiments will not be changeable by a user or operator or during field operation of the vibratory flowmeter 5.

If the difference in meter mass values at first and second pick off sensors 170L and 170R is substantially the same as the baseline meter mass difference 245, then it can be determined that the vibratory flowmeter 5 is relatively unchanged in condition from when it was manufactured, calibrated, or when the vibratory flowmeter 5 was last re-calibrated. Alternatively, where the difference in meter mass values at first and second pick off sensors 170L and 170R significantly differs from the baseline meter mass difference 245, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined meter mass difference range 246. The predetermined meter mass difference range 246 comprises a selected range of acceptable meter mass difference values. The predetermined meter mass difference range 246 may be chosen to account for corrosion or erosion in the vibratory flowmeter 5.

The storage system 204 can store an expected mass deviation 250. The expected mass deviation 250 comprises an expected mass deviation 250 that is determined from factory base-lined air and water masses 241 and the known density of a process fluid. Calculations of expected mass deviation are described in later paragraphs. The expected mass deviation 250 may be generated in order to verify proper operation of the vibratory flowmeter 5. The expected mass deviation 250 may be generated for a verification process, wherein the expected mass deviation 250 serves the purpose of verifying proper and accurate operation of the vibratory flowmeter 5.

In one embodiment, the storage system 204 stores a baseline expected mass deviation 251. In some embodiments, the baseline expected mass deviation 251 may be programmed into the meter electronics 20 at the factory (or other manufacturer facility), such as upon construction or sale of the vibratory flowmeter 5. Alternatively, baseline expected mass deviation value 251 may be programmed into the meter electronics 20 during a field calibration operation or other calibration or re-calibration operation. However, it should be understood that the baseline expected mass deviation 251 in most embodiments will not be changeable by a user or operator or during field operation of the vibratory flowmeter 5.

If the expected mass deviation 250 is substantially the same as the baseline expected mass deviation 251, then it can be determined that the vibratory flowmeter 5 is relatively unchanged in condition from when it was manufactured, calibrated, or when the vibratory flowmeter 5 was last re-calibrated. Alternatively, where the expected mass deviation 250 significantly differs from the baseline expected mass deviation 251, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined expected mass deviation range 252. The predetermined expected mass deviation range 252 comprises a selected range of acceptable expected mass deviation values. The predetermined expected mass deviation value range 252 may be chosen to account for corrosion or erosion in the vibratory flowmeter 5.

In one embodiment, the storage system 204 stores a baseline expected mass deviation difference 255. In some embodiments, the baseline expected mass deviation difference 255 may be programmed into the meter electronics 20 at the factory (or other manufacturer facility), such as upon construction or sale of the vibratory flowmeter 5. Alternatively, the baseline expected mass deviation difference 255 may be programmed into the meter electronics 20 during a field calibration operation or other calibration or re-calibration operation. However, it should be understood that the baseline expected mass deviation difference 255 in most embodiments will not be changeable by a user or operator or during field operation of the vibratory flowmeter 5.

If the difference in expected mass deviation values at first and second pick off sensors 170L and 170R is substantially the same as the baseline meter mass deviation difference 255, then it can be determined that the vibratory flowmeter 5 is relatively unchanged in condition from when it was manufactured, calibrated, or when the vibratory flowmeter 5 was last re-calibrated. Alternatively, where the difference in expected mass deviation values at first and second pick off sensors 170L and 170R significantly differs from the baseline expected mass deviation difference 255, then it can be determined that the vibratory flowmeter 5 has been degraded and may not be operating accurately and reliably, such as where the vibratory flowmeter 5 has changed due to metal fatigue, corrosion, erosion due to flow, or other operating condition or effect.

In one embodiment, the storage system 204 stores a predetermined expected mass deviation difference range 256. The predetermined expected mass deviation difference range 256 comprises a selected range of acceptable expected mass deviation difference values. The predetermined expected mass deviation difference range 256 may be chosen to account for corrosion or erosion in the vibratory flowmeter 5.

The storage system 204 can store a density value 260. The density value 260 comprises a density value that is determined from vibrational responses generated during operation of the vibratory flowmeter 5. The density value 260 may be generated in order to verify proper operation of the vibratory flowmeter 5. The density value 260 may be generated for a verification process, wherein the density value 260 serves the purpose of verifying proper and accurate operation of the vibratory flowmeter 5.

The storage system 204 can store a damping value 270. The damping value 270 comprises a density value that is determined from vibrational responses generated during operation of the vibratory flowmeter 5. The damping value 270 may be generated in order to verify proper operation of the vibratory flowmeter 5. The damping value 270 may be generated for a verification process, wherein the damping value 270 serves the purpose of verifying proper and accurate operation of the vibratory flowmeter 5.

In one embodiment, the storage system 204 stores an operational routine 210. The operational routine 210, when executed by the processing system 203, operates the vibratory flowmeter 5, including vibrating the flowmeter assembly 10, receiving subsequent first and second sensor signals, and generating one or more flow characteristics from the first and second sensor signals. The operational routine 210 can also perform other operations, including communications operations and meter verification operations, for example. Other meter operations are contemplated and are within the scope of the description and claims.

In some embodiments, the storage system 204 stores a verification routine 213. The verification routine 213, when executed by the processing system 203, can perform a verification process for the vibratory flowmeter 5. In example embodiments, the processing system 203 when executing the verification routine 213 is configured to generate meter stiffness, residual flexibility, mass, expected mass deviation, density and damping values. In some embodiments, the processing system 203 when executing the verification routine 213 is configured to generate a meter stiffness value and verify the proper operation of the vibratory flowmeter using the meter stiffness value. In some embodiments, the processing system 203 when executing the verification routine 213 is configured to generate a meter residual flexibility value and verify the proper operation of the vibratory flowmeter using the meter residual flexibility value. In some embodiments, the processing system 203 when executing the verification routine 213 is configured to generate a meter mass value and verify the proper operation of the vibratory flowmeter using the meter mass value. In some embodiments, the processing system 203 when executing the verification routine 213 is configured to generate an expected mass deviation value and verify the proper operation of the vibratory flowmeter using the meter expected mass deviation value. In some embodiments, the processing system 203 when executing the verification routine 213 is configured to generate a density value and verify the proper operation of the vibratory flowmeter using the meter density value. In some embodiments, the processing system 203 when executing the verification routine 213 is configured to generate a damping value and verify the proper operation of the vibratory flowmeter using the meter damping value.

Figure 4:
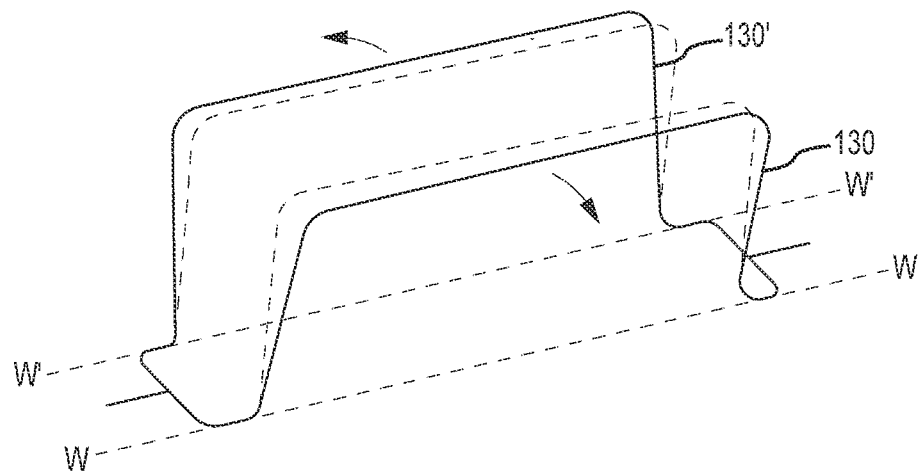
FIG. 4 represents a vibratory flowmeter having curved flowtubes wherein the two parallel curved flowtubes are vibrated in a bending mode.

FIG. 4 represents a vibratory flowmeter 5 having curved flowtubes 130 and 130' wherein the two parallel curved flowtubes 130 and 130' are vibrated in a bending mode. The dashed lines in the figure show the rest positions of the two flowtubes 130 and 130'. In the bending mode, the tubes are vibrated with respect to the bending axes W-W and W'-W'. Consequently, the flowtubes 130 and 130' move periodically away from each other (as shown by the curved arrows), then toward each other. It can be seen that each flowtube 130 and 130' moves as a whole with respect to the bending axes W-W and W'-W'.

Figure 5:
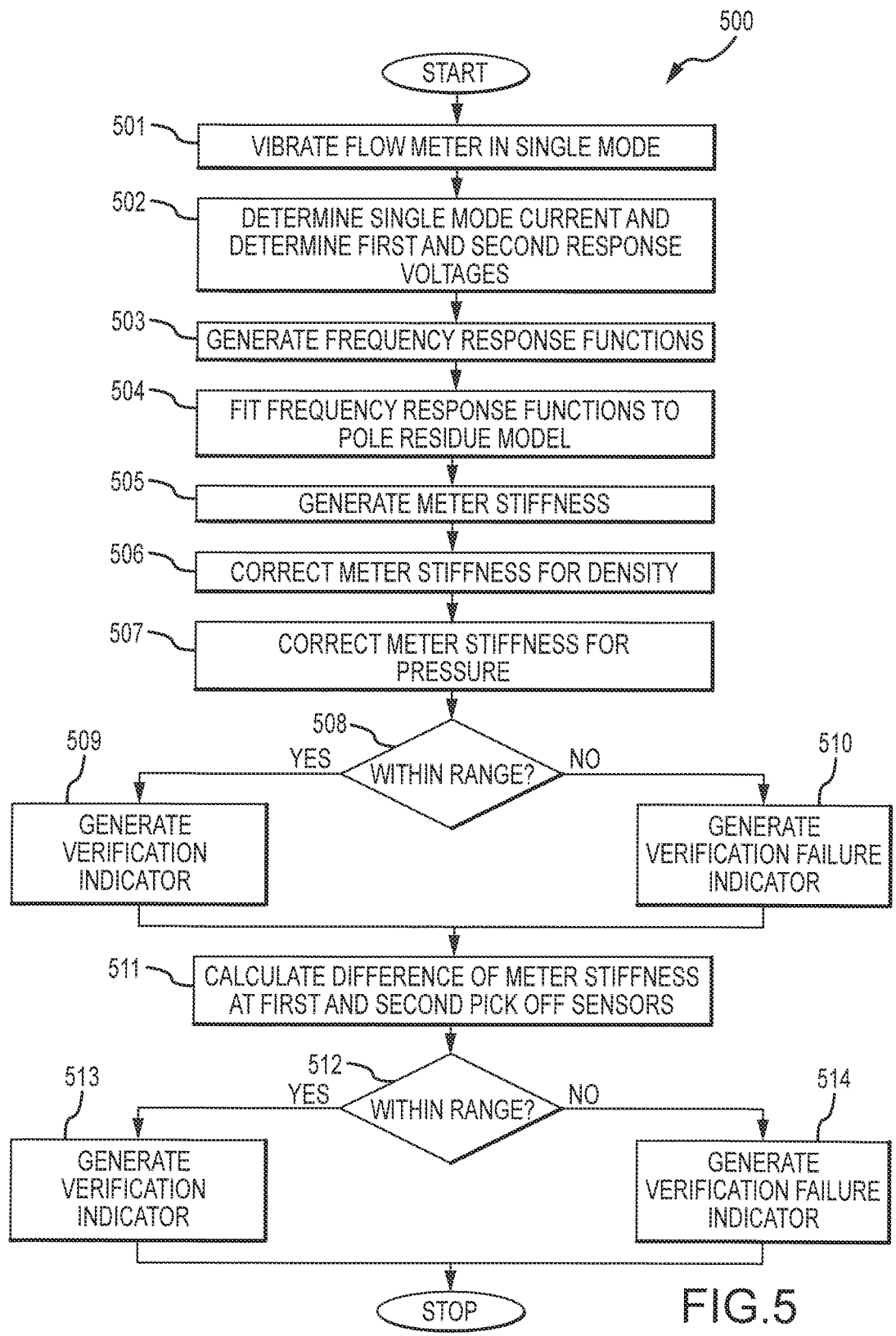
FIG. 5 is a flowchart of a meter verification method for a vibratory flowmeter according to an embodiment of the invention.

FIG. 5 is a flowchart 500 of a meter verification method for a vibratory flowmeter according to embodiments of the invention. In step 501, the meter assembly of the vibratory flowmeter is vibrated in a vibration mode to generate a single mode vibrational response. The single mode vibrational response comprises electrical signals generated by the first and second pickoff sensors 170L and 170R.

In some embodiments, the single vibration mode may comprise a bending mode. It should also be understood that vibrating the flowmeter assembly at the single vibration mode comprising vibrating in a single vibration mode and substantially at a resonance frequency for the predetermined vibration mode.

In step 502, the single mode current is determined as the electrical current flowing through the driver. The current can comprise a commanded value of the current or can comprise a measured current value for the driver 190. Further, the first and second response voltages are determined at the first and second pickoff sensors 170L and 170R, respectively. The first and second response voltages are the response voltages generated by the first and second pickoff sensors. The first and second response voltages of the single mode can comprise voltages generated when operating at or near a resonant frequency of the single vibration mode.

In step 503, frequency response functions (FRFs) are generated for the determined first and second response voltages from the determined single mode current.

In step 504, the generated frequency response functions are fit to the pole residue model as described in earlier paragraphs. The pole-residue frequency response takes the form given in equation 13. Alternatively, the pole-residue residual flexibility response may be used as shown in equation 16.

In step 505, a meter stiffness value is generated. The meter stiffness value may be generated using equation 11.

In step 506, the meter stiffness value is corrected for density. In meter verification, there was previously no need to correct for density. Indeed, fluid, by its definition, has no stiffness and therefore will not affect measured tube stiffness. However, with newer sensor designs, changes in fluid density change the structural dynamics such that the measured tube stiffness does change with density. There is also a possibility that the signal processing is sensitive to frequency or other differences in newer sensor designs that will also cause the stiffness to be a function of density. Regardless of what causes stiffness to change with density, it can be corrected.

An expected stiffness can be developed from the factory air and water baseline stiffnesses and used to normalize the measured stiffness, removing any density dependence. The expected stiffness calculation is shown in the following equation:

$$k_{expected} = k_{factory,air} + \frac{(k_{factory,water} - k_{factory,air})}{(\rho_{water} - \rho_{air})}(\rho_{measured} - \rho_{air}) \quad (17)$$

The expected stiffness normalization is shown the following equation 18, where $StiffnessUncertainty_{measured}$ is the current meter verification temperature corrected stiffness measurement. The equation (18) is repeated for both the left and right pickoff sensors 170L and 170R.

$$StiffnessUncertainty_{Corrected} = StiffnessUncertainty_{Measured}/k_{expected} \quad (18)$$

In step 507 the meter stiffness value is corrected for pressure by the following equation:

$$SMVstiff_{Corrected} = SMVstiff_{Measured}(1+K_P P) \quad (19)$$

Equation 19 shows a form of the pressure correction where $K_P$ is the stiffness compensation factor for pressure and P is the pressure. P may be either a fixed value input by the user, or an external pressure measurement brought into the transmitter. This value P may be the same P used for mass flow and density correction. $K_P$ may have to be determined for each sensor size. The determination of $K_P$ is straightforward, simply measuring stiffness at two pressures and doing a linear fit. $K_P$ will be different than the density pressure coefficient because of secondary effects such as the direct pressure effect.

In step 508, the newly-generated meter stiffness value is compared to the baseline meter stiffness. If the meter stiffness value is within the predetermined stiffness range, then the method branches to step 509. If the meter stiffness value is not within the predetermined stiffness range, then the method branches to step 510.

The comparison may comprise determining a difference between the meter stiffness value and the baseline meter stiffness, wherein the difference is compared to a predetermined stiffness range. The predetermined stiffness range may comprise a stiffness range that includes expected variations in measurement accuracy, for example. The predetermined stiffness range may delineate an amount of change in the meter stiffness that is expected and is not significant enough to generate a verification failure determination.

The predetermined stiffness range may be determined in any manner. In one embodiment, the predetermined stiffness range may comprise a predetermined tolerance range above and below the baseline meter stiffness. Alternatively, the predetermined stiffness range may be derived from a standard deviation or confidence level determination that generates upper and lower range boundaries from the baseline meter stiffness, or using other suitable processing techniques.

In step 509, a verification indication is generated since the difference between the meter stiffness value and the baseline meter stiffness fell within the predetermined stiffness range. The meter stiffness is therefore determined to not have changed significantly. No further action may need to be taken, although the result may be logged, reported, etcetera. The indication may include an indication to the user that the baseline meter stiffness is still valid. The successful verification indication signifies that the baseline meter stiffness is still accurate and useful and that the vibratory flowmeter is still operating accurately and reliably.

In step 510, a verification failure indication is generated since the difference between the meter stiffness value and the baseline meter stiffness has exceeded the predetermined stiffness range. The stiffness of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, etcetera.

In step 511, the difference between the meter stiffness at first and second pickoff sensors 170L and 170R is calculated.

In step 512, the resultant calculated difference value of first and second pickoff sensors 170L and 170R meter stiffness values is compared to the baseline meter stiffness difference. If the resultant calculated difference of meter stiffness values is within the predetermined stiffness difference range, then the method branches to step 513. If the resultant calculated difference of meter stiffness values is not within the predetermined stiffness difference range, then the method branches to step 514.

The comparison may comprise determining a difference between the resultant calculated difference meter stiffness value and the baseline meter stiffness difference value, wherein the difference is compared to a predetermined stiffness difference range. The predetermined stiffness difference range may comprise a stiffness difference range that includes expected variations in measurement accuracy, for example. The predetermined stiffness range may delineate an amount of change in the meter stiffness that is expected and is not significant enough to generate a verification failure determination.

The predetermined stiffness difference range may be determined in any manner. In one embodiment, the predetermined stiffness difference range may comprise a predetermined tolerance range above and below the baseline meter stiffness difference. Alternatively, the predetermined stiffness difference range may be derived from a standard deviation or confidence level determination that generates upper and lower range boundaries from the baseline meter stiffness difference, or using other suitable processing techniques.

In step 513, a verification indication is generated since the difference between the resultant calculated difference meter stiffness value and the baseline meter stiffness difference fell within the predetermined stiffness difference range. The meter stiffness is therefore determined to not have changed significantly. No further action may need to be taken, although the result may be logged, reported, et cetera. The indication may include an indication to the user that the baseline meter stiffness difference is still valid. The successful verification indication signifies that the baseline meter stiffness difference is still accurate and useful and that the vibratory flowmeter is still operating accurately and reliably.

In step 514, a verification failure indication is generated since the difference between the resultant calculated difference meter stiffness value and the baseline meter stiffness difference has exceeded the predetermined stiffness difference range. The stiffness of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, et cetera.

Figure 6:
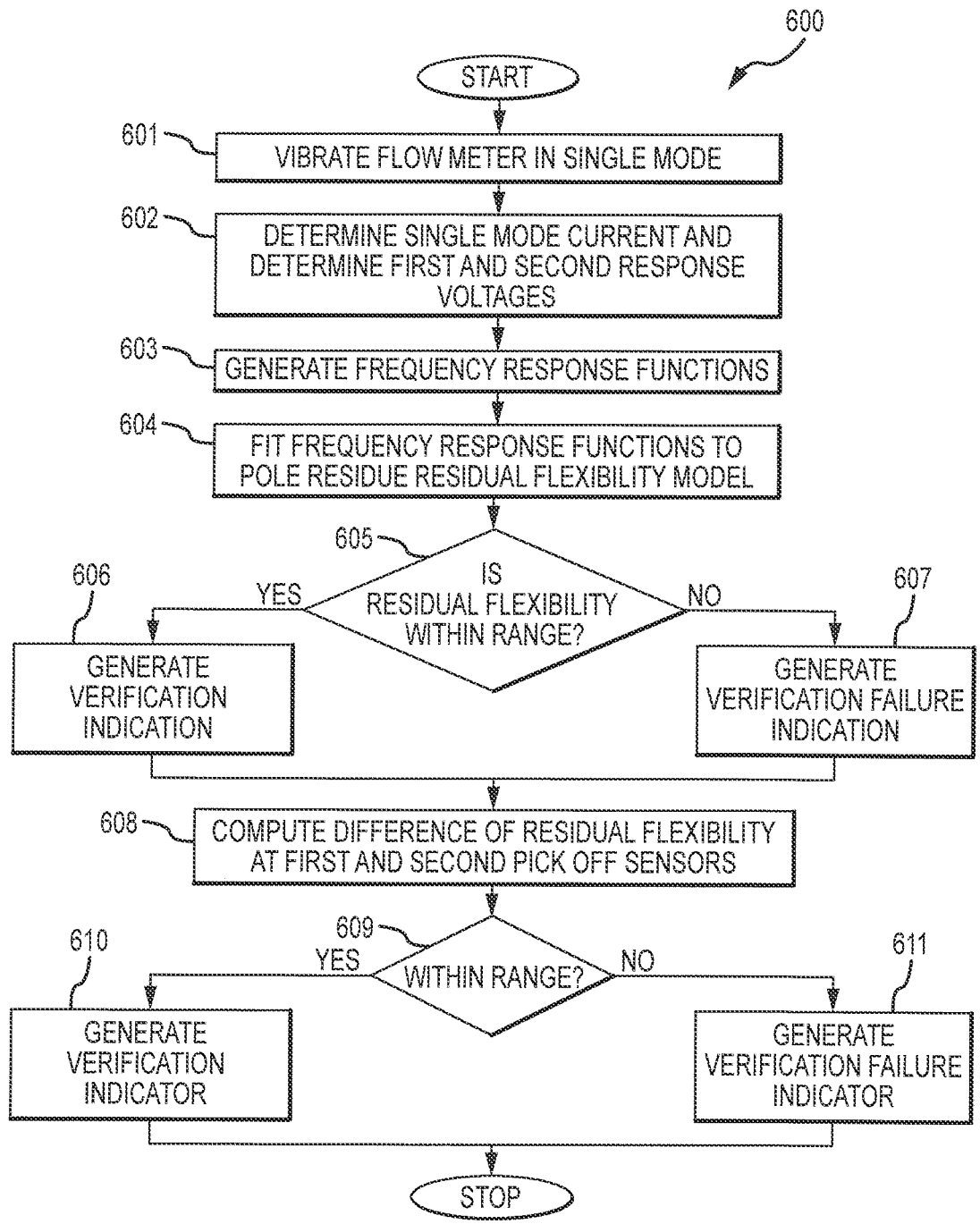
FIG. 6 is a flowchart of a meter verification method for a vibratory flowmeter according to an embodiment of the invention.

FIG. 6 is a flowchart 600 of a meter verification method for a vibratory flowmeter according to embodiments of the invention. In step 601, the meter assembly of the vibratory flowmeter is vibrated in a vibration mode to generate a single mode vibrational response. The single mode vibrational response comprises electrical signals generated by the first and second pickoff sensors 170L and 170R.

In step 602, the single mode current is determined as the electrical current flowing through the driver 180. The current can comprise a commanded value of the current or can comprise a measured current value for the driver 180. Further, the first and second response voltages are determined at the first and second pickoff sensors 170L and 170R, respectively. The first and second response voltages are the response voltages generated by the first and second pickoff sensors. The first and second response voltages of the single mode can comprise voltages generated when operating at or near a resonant frequency of the single vibration mode.

In step 603, frequency response functions (FRFs) are generated for the determined first and second response voltages from the determined single mode current.

In step 604, the generated frequency response functions are fit to the pole residue residual flexibility model as described in earlier paragraphs. The first order pole-residue residual flexibility frequency response takes the form given in equation 16. Further iterations are computed according to equations 14-16 and its related discussion.

In step 605, the residual flexibility value is compared to the baseline meter residual flexibility. If the residual flexibility value is within the predetermined residual flexibility range, then the method branches to step 606. If the residual flexibility value is not within the predetermined residual flexibility range, then the method branches to step 607.

The comparison may comprise determining a difference between the residual flexibility value and the baseline residual flexibility, wherein the difference is compared to a predetermined residual flexibility range. The predetermined residual flexibility range may comprise a residual flexibility range that includes expected variations in measurement accuracy, for example. The predetermined residual flexibility range may delineate an amount of change in the residual flexibility that is expected and is not significant enough to generate a verification failure determination.

The predetermined residual flexibility range may be determined in any manner. In one embodiment, the predetermined residual flexibility range may comprise a predetermined tolerance range above and below the baseline meter residual flexibility. Alternatively, the predetermined residual flexibility range may be derived from a standard deviation or confidence level determination that generates upper and lower range boundaries from the baseline meter residual flexibility, or using other suitable processing techniques.

In step 606, a verification indication is generated since the difference between the meter residual flexibility value and the baseline meter residual flexibility fell within the predetermined residual flexibility range. The meter residual flexibility is therefore determined to not have changed significantly. No further action may need to be taken, although the result may be logged, reported, etcetera. The indication may include an indication to the user that the baseline meter residual flexibility is still valid. The successful verification indication signifies that the baseline meter residual flexibility is still accurate and useful and that the vibratory flowmeter is still operating accurately and reliably.

In step 607, a verification failure indication is generated since the difference between the meter residual flexibility value and the baseline meter residual flexibility has exceeded the predetermined residual flexibility range. The residual flexibility of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, et cetera.

In step 608, the difference between the residual flexibility values at first and second pickoff sensors 170L and 170R is calculated.

In step 609, the resultant calculated difference value of first and second pickoff sensors 170L and 170R residual flexibility values is compared to the baseline residual flexibility difference. If the resultant calculated difference residual flexibility value is within the predetermined residual flexibility difference range, then the method branches to step 610. If the resultant difference residual flexibility value is not within the predetermined residual flexibility difference range, then the method branches to step 611.

The comparison may comprise determining a difference between the resultant calculated difference meter residual flexibility value and the baseline residual flexibility difference, wherein the difference is compared to a predetermined residual flexibility difference range. The predetermined residual flexibility difference range may comprise a residual flexibility difference range that includes expected variations in measurement accuracy, for example. The predetermined residual flexibility difference range may delineate an amount of change in the residual flexibility difference that is expected and is not significant enough to generate a verification failure determination.

The predetermined residual flexibility difference range may be determined in any manner. In one embodiment, the predetermined residual flexibility difference range may comprise a predetermined tolerance range above and below the baseline residual flexibility difference. Alternatively, the predetermined residual flexibility difference range may be derived from a standard deviation or confidence level determination that generates upper and lower range boundaries from the baseline residual flexibility difference, or using other suitable processing techniques.

In step 610, a verification indication is generated since the difference between the resultant calculated difference meter residual flexibility value and the baseline meter residual flexibility difference fell within the predetermined residual flexibility difference range. The meter residual flexibility is therefore determined to not have changed significantly. No further action may need to be taken, although the result may be logged, reported, etcetera. The indication may include an indication to the user that the baseline residual flexibility difference is still valid. The successful verification indication signifies that the baseline residual flexibility is still accurate and useful and that the vibratory flowmeter is still operating accurately and reliably.

In step 611, a verification failure indication is generated since the difference between the resultant calculated difference meter residual flexibility value and the baseline residual flexibility difference has exceeded the predetermined residual flexibility difference range. The residual flexibility difference of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, etcetera.

Figure 7:
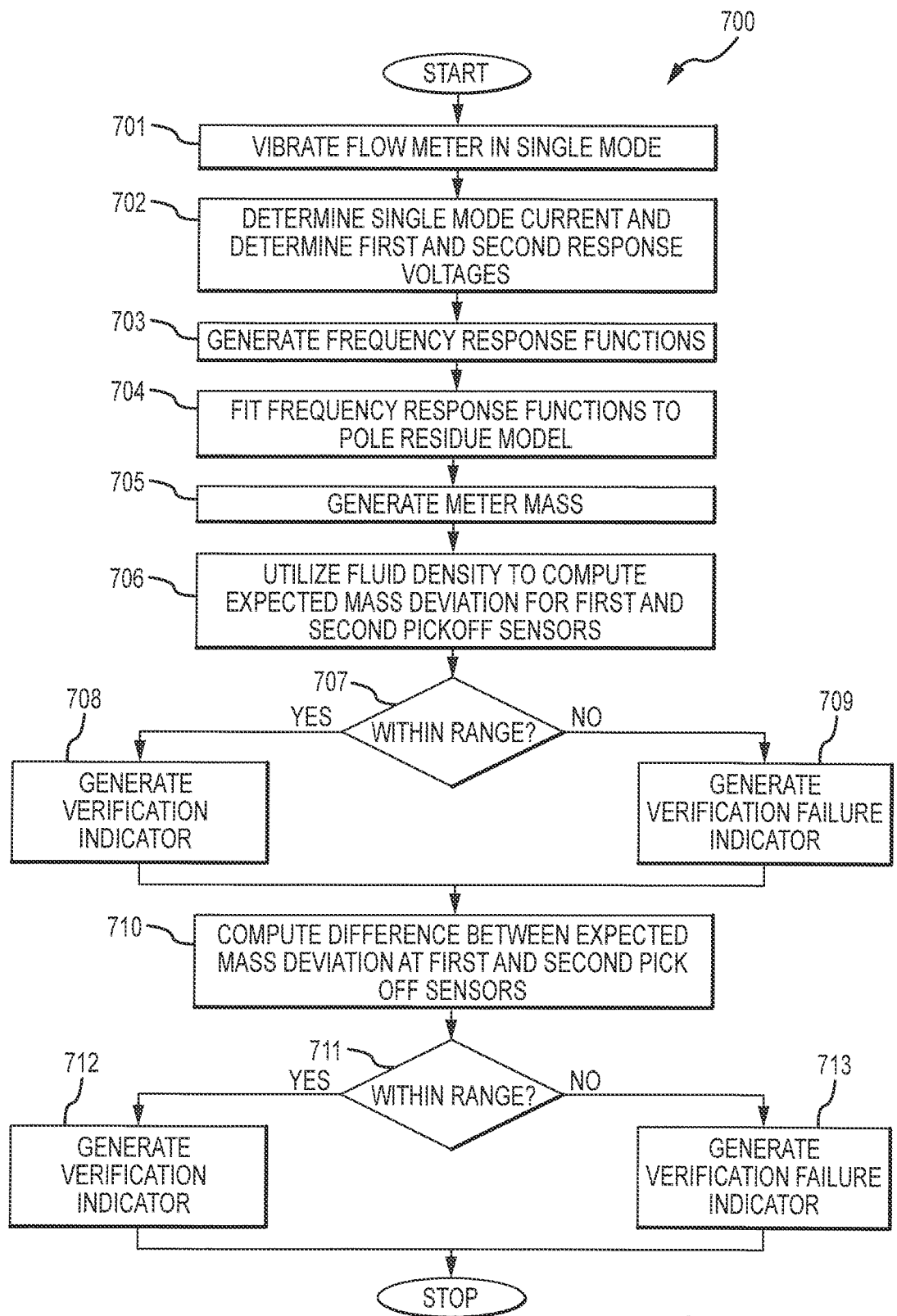
FIG. 7 is a flowchart of a meter verification method for a vibratory flowmeter according to an embodiment of the invention.

FIG. 7 is a flowchart 700 of a meter verification method for a vibratory flowmeter according to embodiments of the invention. In step 701, the meter assembly of the vibratory flowmeter is vibrated in a vibration mode to generate a single mode vibrational response. The single mode vibrational response comprises electrical signals generated by the first and second pickoff sensors 170L and 170R.

In step 702, the single mode current is determined as the electrical current flowing through the driver 180. The current can comprise a commanded value of the current or can comprise a measured current value for the driver 180. Further, the first and second response voltages are determined at the first and second pickoff sensors 170L and 170R, respectively. The first and second response voltages are the response voltages generated by the first and second pickoff sensors. The first and second response voltages of the single mode can comprise voltages generated when operating at or near a resonant frequency of the single vibration mode.

In step 703, frequency response functions (FRFs) are generated for the determined first and second response voltages from the determined single mode current.

In step 704, the generated frequency response functions are fit to the pole residue model as described in earlier paragraphs. The pole-residue frequency response takes the form given in equation 13.

In step 705, a meter mass value is generated. The meter mass value may now be generated using equation 10.

In step 706, fluid density is utilized to calculate an expected mass deviation for first and second pickoff sensors 170L and 170R is calculated (as explained in equations 21 and 22 and its related description in later paragraphs). In aspects, fluid density may either include measured process fluid density or alternatively, an operator may input an expected fluid density.

In step 707, the calculated expected mass deviation is compared to the baseline expected mass deviation. If the calculated expected mass deviation is within the predetermined expected mass deviation range, then the method branches to step 708. If the calculated mass deviation is not within the predetermined expected mass deviation range, then the method branches to step 709.

The comparison may comprise determining a difference between the calculated expected mass deviation to the baseline expected mass deviation, wherein the difference is compared to a predetermined expected mass deviation range. The predetermined expected mass deviation range may comprise an expected mass deviation range mass that includes expected variations in measurement accuracy, for example. The predetermined expected mass deviation value range may delineate an amount of change in the mass value that is expected and is not significant enough to generate a verification failure determination.

The predetermined expected mass deviation range may be determined in any manner. In one embodiment, the predetermined expected mass deviation range may comprise a predetermined tolerance above and below the baseline expected mass deviation value. Alternatively, the predetermined mass value range may be derived from a standard deviation or confidence level determination that generates upper and lower range boundaries from the baseline meter expected mass deviation value or using other suitable processing techniques.

In step 708, a verification indication is generated since the difference between the expected mass deviation and the baseline expected mass deviation fell within the predetermined expected mass deviation value range. The expected mass deviation is therefore determined to not have changed significantly. No further action may need to be taken, although the result may be logged, reported, et cetera. The indication may include an indication to the user that the baseline expected mass deviation is still valid. The successful verification indication signifies that the baseline expected mass deviation is still accurate and useful and that the vibratory flowmeter is still operating accurately and reliably.

In step 709, a verification failure indication is generated since the difference between the expected mass deviation and the baseline expected mass deviation has exceeded the predetermined expected mass deviation range. The expected mass deviation of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, etcetera.

In step 710, a difference between expected mass deviation at first and second pick off sensors 170L and 170R is determined.

In step 711, the calculated difference expected mass deviation is compared to the baseline expected mass deviation difference. If the calculated difference expected mass deviation is within the predetermined expected mass deviation difference value range, then the method branches to step 712. If the resultant calculated difference expected mass deviation is not within the predetermined expected mass deviation difference range, then the method branches to step 713.

The comparison may comprise determining a difference between the resultant calculated difference expected mass deviation to the baseline expected mass deviation difference, wherein the difference is compared to a predetermined expected mass deviation difference range. The predetermined expected mass deviation difference range may comprise an expected mass deviation difference range that includes expected variations in measurement accuracy, for example. The predetermined expected mass deviation difference range may delineate an amount of change in the mass value that is expected and is not significant enough to generate a verification failure determination.

The predetermined expected mass deviation difference range may be determined in any manner. In one embodiment, the predetermined expected mass deviation difference range may comprise a predetermined tolerance above and below the baseline expected mass deviation. Alternatively, the predetermined mass difference range may be derived from a standard deviation or confidence level determination that generates upper and lower range boundaries from the baseline meter expected mass deviation difference or using other suitable processing techniques.

In step 712, a verification indication is generated since the difference between the resultant calculated difference expected mass deviation and the baseline expected mass deviation difference fell within the predetermined expected mass deviation difference range. The expected mass deviation difference is therefore determined to not have changed significantly. No further action may need to be taken, although the result may be logged, reported, etcetera. The indication may include an indication to the user that the baseline expected mass deviation difference is still valid. The successful verification indication signifies that the baseline expected mass deviation difference is still accurate and useful and that the vibratory flowmeter is still operating accurately and reliably.

In step 713, a verification failure indication is generated since the difference between the calculated difference expected mass deviation and the baseline expected mass deviation difference value has exceeded the predetermined expected mass deviation difference range. The expected mass deviation difference of the meter is therefore determined to have changed significantly. As part of the non-verification indication, a software flag, visual indicator, message, alarm, or other indication may be generated in order to alert the user that the flowmeter may not be acceptably accurate and reliable. In addition, the result may be logged, reported, etcetera.

According to example embodiments as described in FIG. 5, a diagnostic using the actual stiffness or the difference between the first and second pickoff sensors' 170L and 170R stiffness values may be used as a flowmeter verification parameter to determine coating, corrosion, erosion, or other flowtube damage as well as validate flow and density measurement.

Advantageously, the diagnostic according to an embodiment takes advantage of the inherent symmetry of Coriolis sensors. Smart Meter Verification (SW) tracks the stiffness at various locations over time and confirms their stability. If a meter is changing, existing products wait until the signal changes by 4% before flagging the operator. According to example embodiments, changes to the sensor may be made more quickly than what is known in the art.

Figure 8:
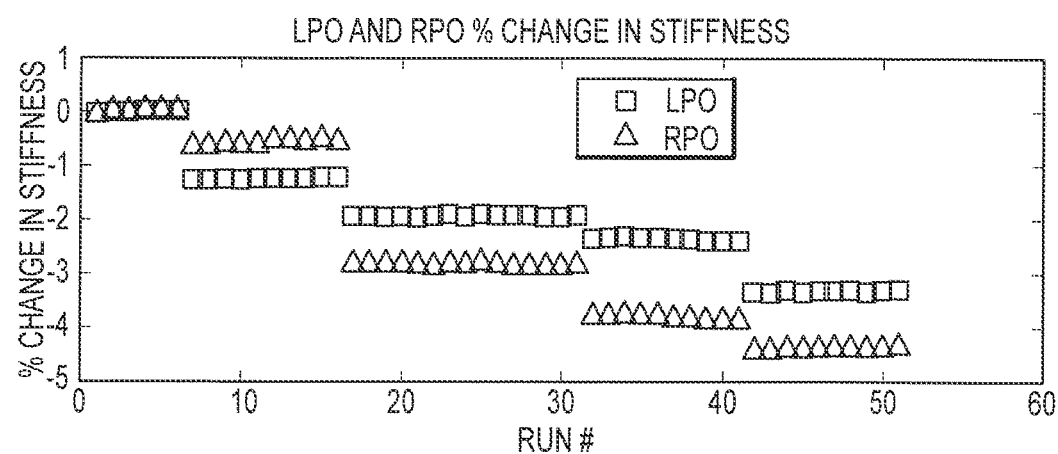
FIG. 8 shows a graphical representation of meter verification according to an embodiment of the invention.

FIG. 8 shows a diagnostic according to an example embodiment. In FIG. 8, an example smart meter verification plot representing the percentage change in stiffness of the left pickoff (LPO) and right pickoff (RPO) sensors is shown. The y-axis represents the percentage value changes in stiffness and the x-axis represents the run counter. The example SMV plot illustrates the baseline along with four corrosion conditions on the x-axis. The example data includes results from an example flowmeter with both air and water as process fluid. According to the SMV plot, data points corresponding to runs 1 through 6 are shown to have an approximately zero percent change in stiffness, which demonstrates the unchanging nature of this particular SMV diagnostic. However, as shown from the data points corresponding to runs 7 through 51, the effect on meter stiffness is clearly represented as the example flowmeter is progressively corroded.

Figure 9:
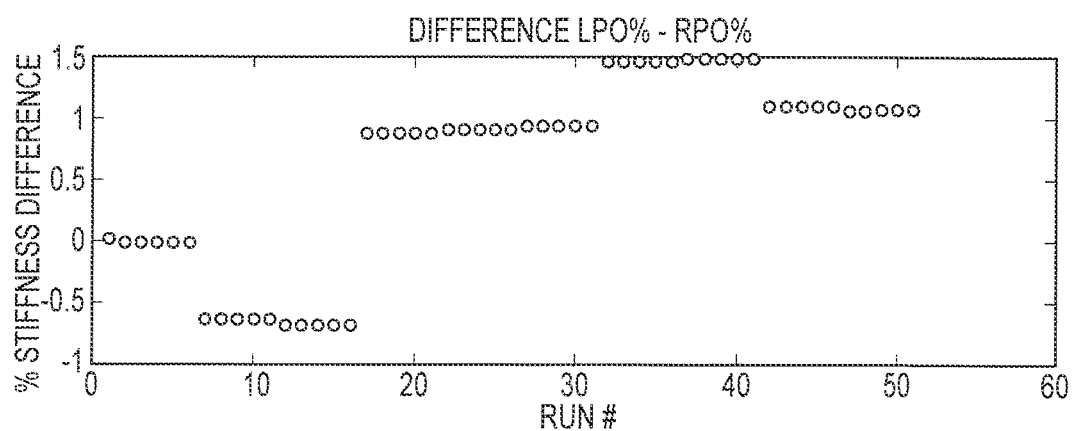
FIG. 9 shows a graphical representation of meter verification according to an embodiment of the invention.

FIG. 9 shows a diagnostic according to an example embodiment, utilizing the difference between the left pick off (LPO) and right pick off (RPO) stiffness data as a parameter. The y-axis represents the percentage difference changes in stiffness and the x-axis represents the run counter. Of note, there is seen a bias between the LPO and RPO, but that the bias has very small variation. The example plot illustrates the baseline along with four corrosion conditions on the x-axis. In confirmation to FIG. 8, while data points corresponding to runs 1 through 6 are shown to have an approximately zero percent change in stiffness difference, the data points corresponding to runs 7 through 51, clearly show the effect on meter stiffness difference as the example flowmeter is progressively corroded.

According to example embodiments as described in FIG. 6, a diagnostic implementing the meter verification method applying the calculated difference of the residual flexibilities of the first and second pickoff sensors 170L and 170R may be used as a flowmeter verification parameter to determine coating, corrosion, erosion, or other flowtube damage.

Figure 10:
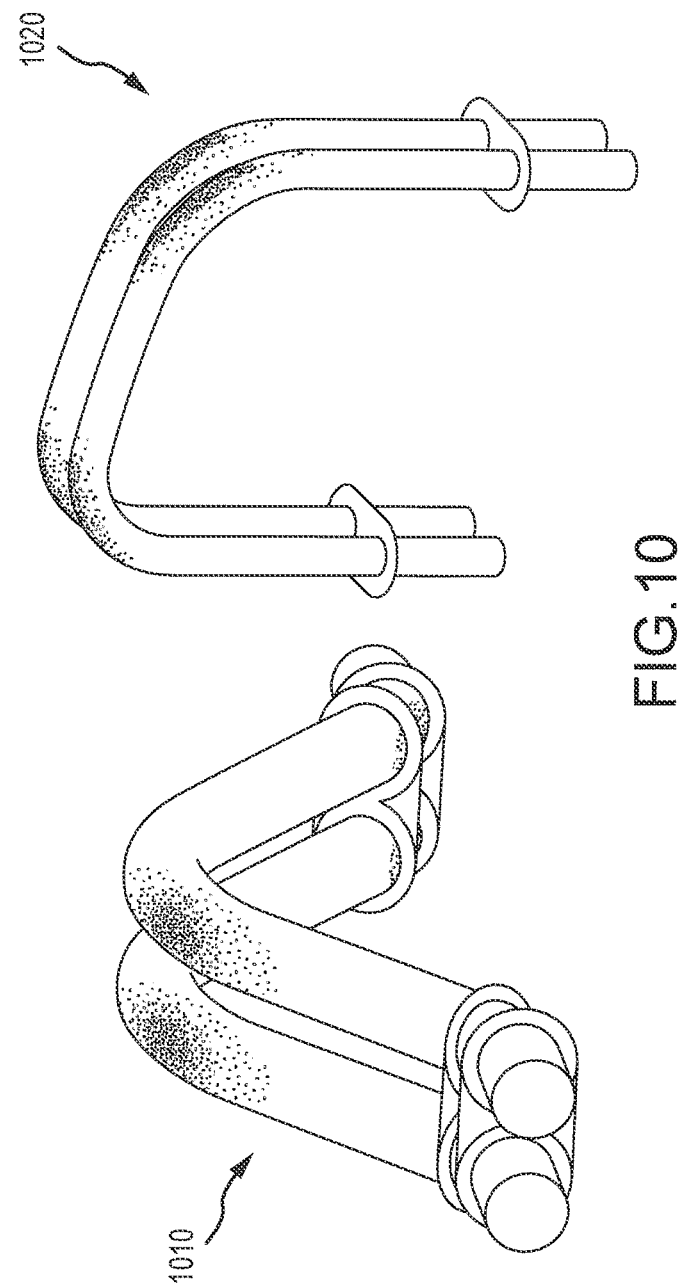
FIG. 10 shows a graphical representation of meter verification according to an embodiment of the invention.
Figure 11:
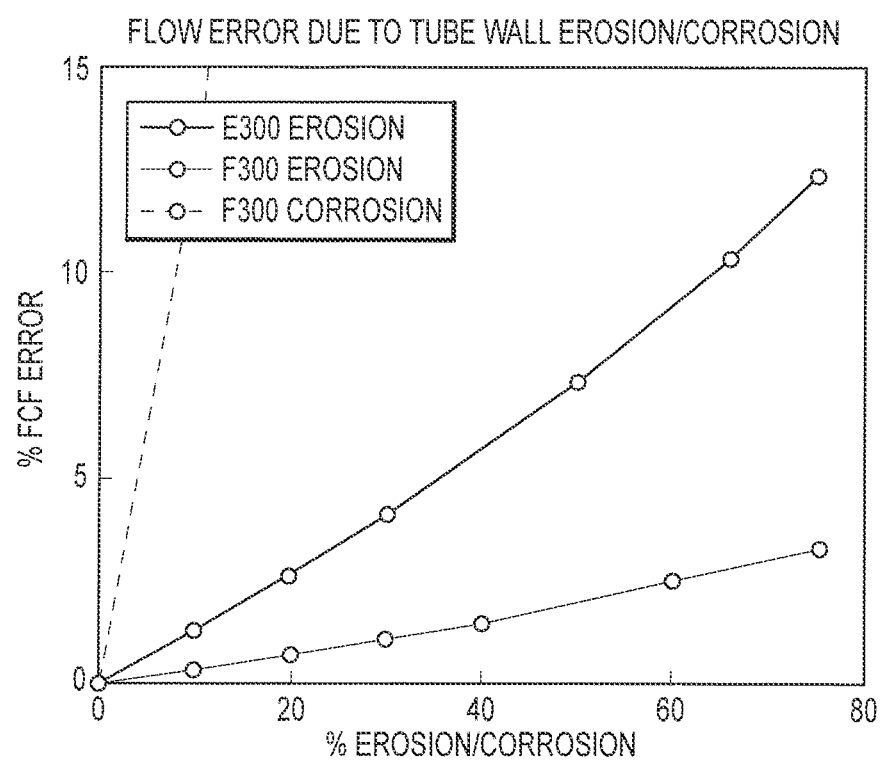
FIG. 11 shows a graphical representation represent of meter verification according to an embodiment of the invention.
Figure 12:
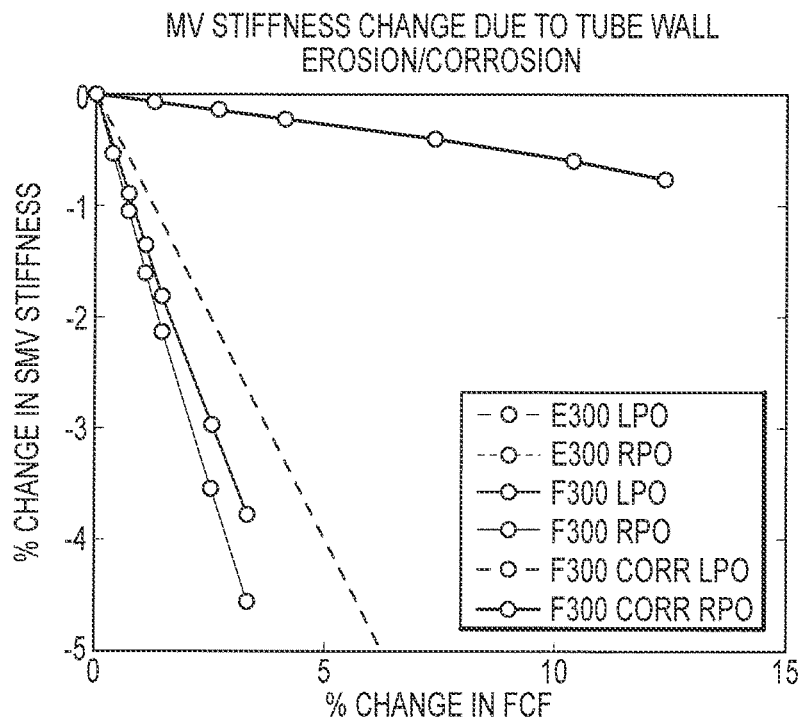
FIG. 12 shows a graphical representation of meter verification according to an embodiment of the invention.
Figure 13:
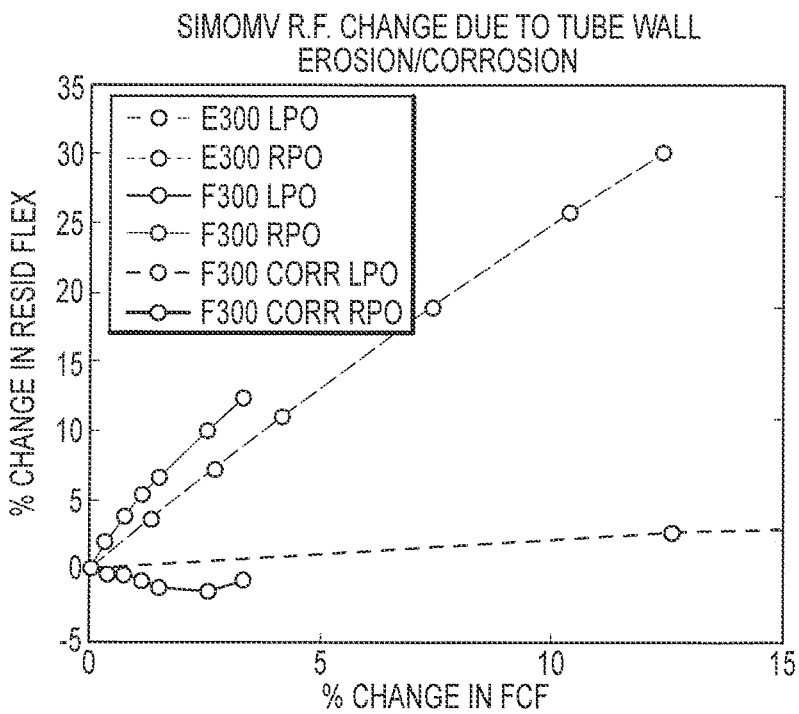
FIG. 13 shows a graphical representation of meter verification according to an embodiment of the invention.
Figure 14:
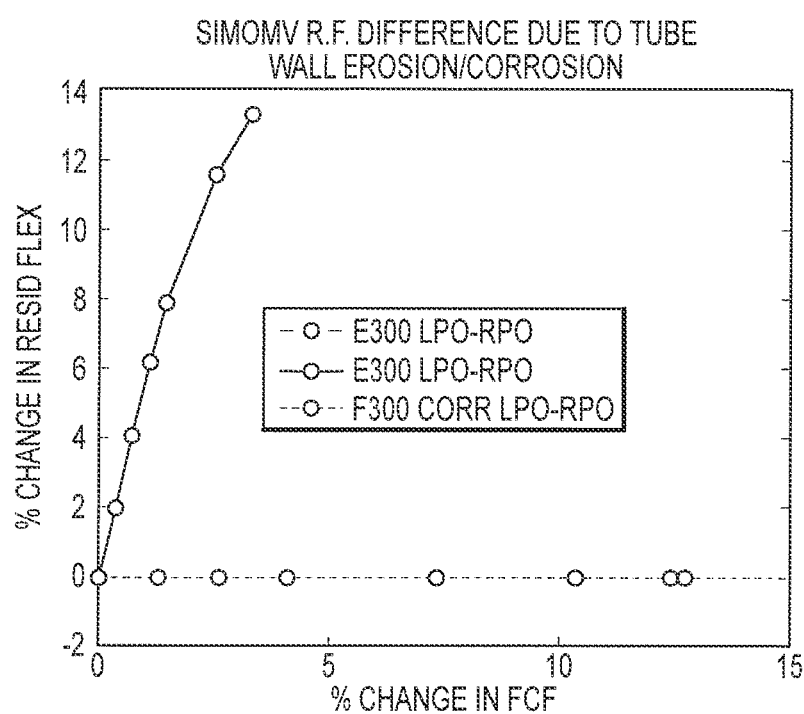
FIG. 14 shows a graphical representation of meter verification according to an embodiment of the invention.

FIG. 10 shows separate example model cases for locations of meter damage by corrosion or erosion. Uniform corrosion on the, example, F300 flow meter 1010 was modeled as a uniform change in the tube wall. Erosion on the F300 flow meter 1010 was modeled by locally changing the tube wall in the area of the inlet bend. Erosion on the, example, E300 flow meter 1020 was modeled by a symmetric change in wall thickness at the bends. FIG. 11 shows a graph representing the flow error due to tube wall erosion and/or corrosion, where the percentage of Flow Calibration Factor (FCF) error is plotted against the percentage of erosion and/or corrosion. Based on the graph, there is obvious flow error due to these tube wall changes. FIG. 12 shows a graph representing the meter verification stiffness change due to tube wall erosion/corrosion. It plots the meter verification stiffness versus the change in the Flow Calibration Factor (FCF). From the graph, a large change in stiffness is seen for the two F300 flow meter 1010 conditions. Accordingly, this large change indicates that an aspect of the present invention would readily detect F300 flow meter 1010 erosion and the uniform corrosion. Nevertheless, the stiffness change for the more symmetrically eroded E300 flow meter 1020 is less than 1% for a 12% FCF change, which may demonstrate poor detectability for this condition. FIG. 13 shows a graph representing the change in residual flexibility (RF) versus the change in the FCF. Residual flexibility changes may easily detect the F300 flow meter 1010 erosion, but not as well for the F300 flow meter 1010 uniform corrosion. However, the symmetric erosion of the E300 flow meter 1020 may easily be detected. Accordingly, these graphs demonstrate how the combination of residual flexibility and meter verification stiffness allow for a robust diagnostic to detect erosion and corrosion. FIG. 14 shows a diagnostic, according to an embodiment of the present invention, applying the difference between the residual flexibilities of the first and second pickoff sensors 170F and 170R. According to FIG. 14, where the changes to the tube wall are symmetric, for example, the F300 flow meter 1010 corrosion and the E300 flow meter 1020 erosion, the residual flexibility difference may be quite small. Nevertheless, the asymmetric F300 flow meter 1010 erosion shows a large and significant value for the residual flexibility difference.

According to example embodiments of the present invention, the simple difference in the mass estimates between the first and second pickoff sensors 170L and 170R may be used as a flowmeter verification diagnostic parameter to determine coating, corrosion, erosion, or other flow tube damage.

According to example embodiments, as described in the FIG. 7, a diagnostic applying the difference between the expected mass data of the first and second pickoff sensors 170L and 170R may be used as a flowmeter verification diagnostic parameter to determine coating, corrosion, erosion, or other flowtube damage. Further, in conjuration with stiffness information, for example the meter stiffness, the two diagnostics may differentiate between coating and erosion. In aspects of the invention, this mass estimate data diagnostic parameter utilizes the inherent symmetry of Coriolis sensor and can be derived from the above described meter verification calculations.

Figure 15:
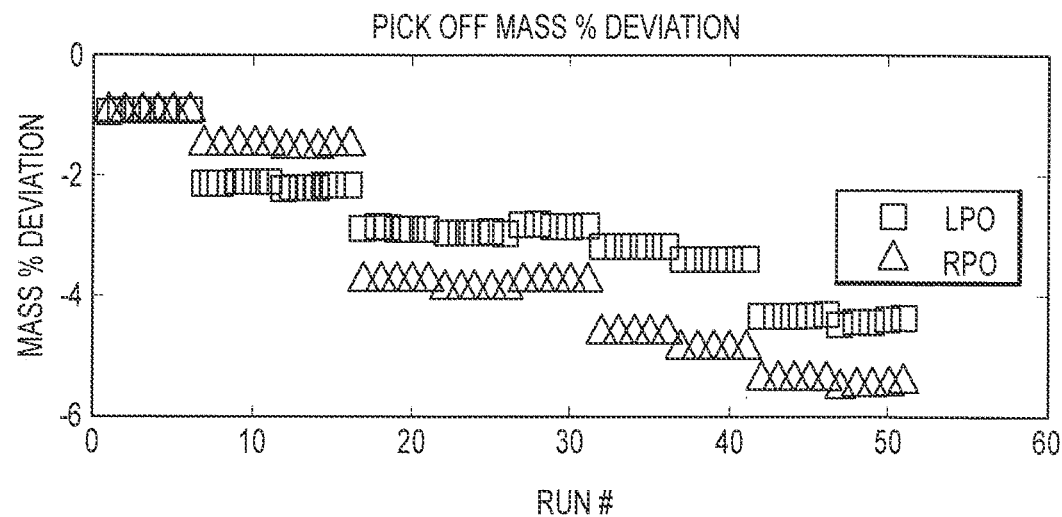
FIG. 15 shows a graphical representation of meter verification according to an embodiment of the invention.

FIG. 15 shows a diagnostic according to an example embodiment. In FIG. 15, an example smart meter verification plot representing the percentage change in mass deviation of the left pickoff (LPO) and right pickoff (RPO) sensors is shown. The y-axis represents the percentage value changes in mass deviation and the x-axis represents the run counter. The example SMV plot illustrates the baseline along with nine corrosion conditions on the x-axis. The example data includes results from an example flowmeter with both air and water as process fluid, According to the SMV plot, data points corresponding to runs 1 through 6 are shown to have an approximately zero percent change in mass deviation, which demonstrates the unchanging nature of this particular SMV diagnostic. However, as shown from the data points corresponding to runs 7 through 51, the effect on mass deviation is clearly represented as the example flowmeter is progressively corroded.

In embodiments, the process fluid density may be either measured or inputted by an operator. While using the process fluid density with the mass estimates, two further coating detection parameters may be defined. In aspects, the "expected" mass based on the factory base-lined air and water masses, and the measured known density of the process fluid may be calculated by:

$$m_{expected} = m_{factory,air} + \frac{(m_{factory,water} - m_{factory,air})}{(\rho_{water} - \rho_{air})}(\rho_{known} - \rho_{air}) \quad (20)$$

Further, the expected mass may be used to calculate a normalized mass deviation expressed as a percentage via the following equation:

$$mass_{Deviation} = \frac{mass_{measured} - mass_{expected}}{mass_{expected}} * 100 \quad (21)$$

Figure 16:
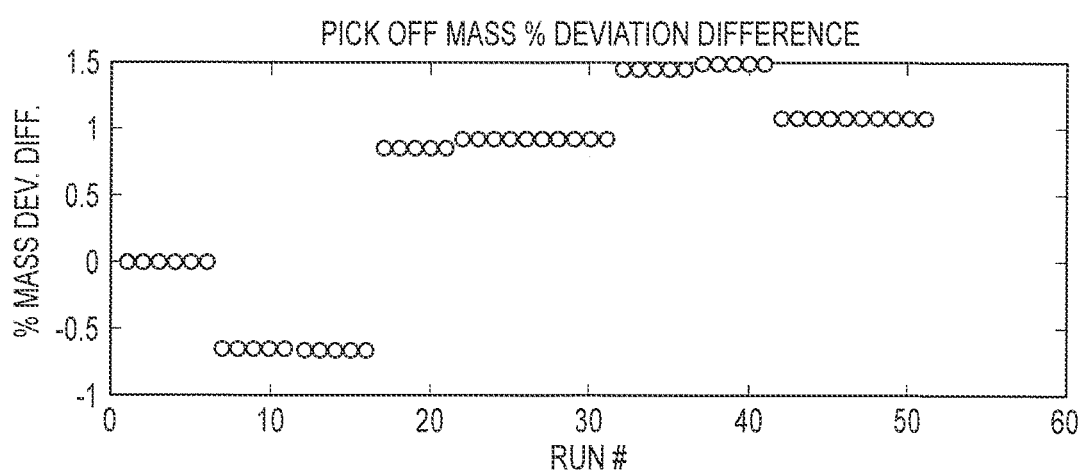
FIG. 16 shows a graphical representation of meter verification according to an embodiment of the invention.

FIG. 16 shows a diagnostic according to an example embodiment, utilizing the difference between the left pick off (LPO) and right pick off (RPO) mass deviation data as a parameter. The y-axis represents the percentage difference changes in mass deviation and the x-axis represents the run counter. Of note, there is seen a bias between the LPO and RPO, but that the bias has very small variation. The example plot illustrates the baseline along with four corrosion conditions on the x-axis. In confirmation to FIG. 15, while data points corresponding to runs 1 through 6 are shown to have an approximately zero percent change in stiffness difference, the data points corresponding to runs 7 through 51, clearly show the effect on meter mass deviation difference as the example flowmeter is progressively corroded.

According to example embodiments of the present invention, density may be used as a flowmeter verification diagnostic parameter to determine coating, corrosion, erosion, or other flow tube damage.

Figure 17:
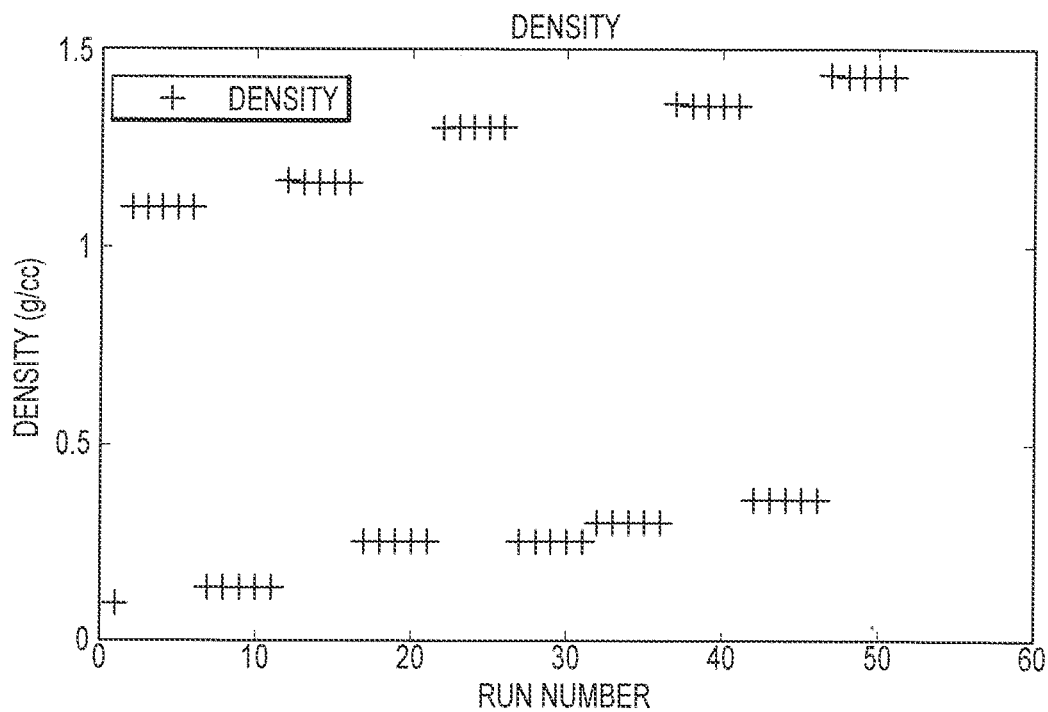
FIG. 17 shows a graphical representation of meter verification according to an embodiment of the invention.

FIG. 17 shows a diagnostic according to an example embodiment. In FIG. 17, an example smart meter verification plot representing density for various runs. The y-axis represents the density and the x-axis represents the run counter. The example SMV density plot illustrates the baseline for air and water along with nine corrosion conditions on the x-axis. The baseline for air is shown in data points corresponding to run 1. The baseline for water is shown in data points corresponding to runs 2 through 6. The example data includes results from an example flowmeter with both air and water as process fluid. According to the example SMV density plot, data points corresponding to runs 1 and 2 through 6 are shown to have an approximately zero percent change in density, which demonstrates the unchanging nature of this particular SMV diagnostic. However, as shown from the data points corresponding to runs 7 through 51, the effect on density is clearly represented as the example flowmeter is progressively corroded.

Figure 18:
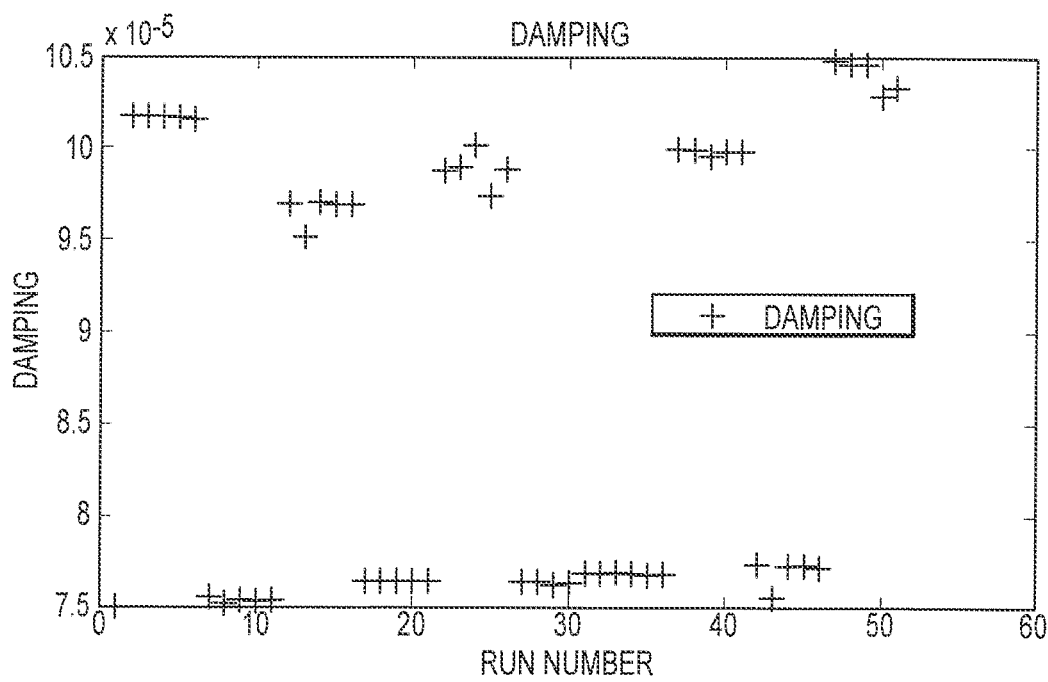
FIG. 18 shows a graphical representation of meter verification according to an embodiment of the invention.

FIG. 18 shows a diagnostic according to an example embodiment. In FIG. 18, an example smart meter verification plot representing density for various runs. The y-axis represents the damping and the x-axis represents the run counter. The example SMV damping plot illustrates the baseline for air and water along with nine corrosion conditions on the x-axis. The baseline for air is shown in data points corresponding to run 1. The baseline for water is shown in data points corresponding to runs 2 through 6. The example data includes results from an example flowmeter with both air and water as process fluid. According to the example SMV damping plot, data points corresponding to runs 1 and 2 through 6 are shown to have an approximately zero percent change in damping with a slight variation to the baseline, which demonstrates the unchanging nature of this particular SMV diagnostic. However, as shown from the data points corresponding to runs 7 through 51, the effect on damping is clearly represented as the example flowmeter is progressively corroded.

In aspects of the present invention, appropriate density alarm limits could be set to flag coating. These alarm limits could be set dynamically based on an initial process density. Additionally, according to an aspect of example embodiments, this parameter could be used to detect erosion. As an example, for operators who are worried about erosion, density may be tracked, and if the density reading decreases below expected limits due to material removal, an alarm can be triggered.

The description above provides multiple methods for generating meter verification diagnostic parameters for a vibratory flowmeter (5). According to an embodiment of the invention, the deviation in the flowmeter parameter may be used to generate a diagnostic, which may be indicative of coating, corrosion, erosion, and/or flow tube damage. Each of the methods includes different advantages and the particular method employed may depend on the existing circumstances or equipment available. Some of the methods allow for a detection of a deviation in a parameter in the absence of a deviation in the flow rate measurement. In addition, more than one method or all of the methods discussed above may be incorporated into a single flow meter system. Therefore, meter electronics 20 may compare the detection obtained using one method to the results obtained from another method.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other flow meters, and not just to the embodiments described above and shown in the accompanying figures. Accordingly, the scope of the invention should be determined from the following claims.

What is claimed is:

1. A vibratory flowmeter (5) for meter verification, the vibratory flowmeter (5) comprising:
a flowmeter assembly (10) including one or more flowtubes (130, 130') and first and second pickoff sensors (170L, 170R);
a driver (180) configured to vibrate the one or more flowtubes (130, 130'); and
meter electronics (20) coupled to the first and second pickoff sensors (170L, 170R) and coupled to the driver (180), with the meter electronics (20) being configured to: vibrate the flowmeter assembly (10) in a single mode using the driver (180), determine a single mode current (230) of the driver (180) and determine first and second response voltages (231) generated by the first and second pickoff sensors (170L, 170R), respectively, compute frequency response functions for the determined first and second response voltages (231) from the determined single mode current (230), fit the generated frequency response functions to a pole-residue model to compute a meter mass value (240), and verify proper and accurate operation of the vibratory flowmeter (5) using the meter mass value (240).

2. The vibratory flowmeter of claim 1, with the meter electronics (20) being further configured to compute a difference of meter mass values at the first and second pickoff sensors (170L and 170R), and verify proper operation of the vibratory flowmeter (5) using the computed difference of the meter mass values.

3. The vibratory flowmeter of claim 2, wherein the verify operation of the vibratory flowmeter using the computed difference of the meter mass values includes: to determine a difference between the computed difference of the meter mass values and a baseline meter mass difference (245), and wherein the determined difference is compared to a predetermined mass difference range (246).

4. The vibratory flowmeter of claim 2, with the meter electronics (20) being further configured to compare the computed difference of the meter mass values to a predetermined mass difference range (246), generate a verification indication for the vibratory flowmeter (5) if the computed difference of the meter mass values falls within the predetermined mass difference range (246), and generate a non-verification indication for the vibratory flowmeter (5) if the computed difference of the meter mass values does not fall within the predetermined mass difference range (246).

5. The vibratory flowmeter of claim 1, with the meter electronics (20) being further configured to utilize a fluid density to compute an expected mass deviation (250) for the first and second pickoff sensors (170L and 170R), and verify proper operation of the vibratory flowmeter (5) using the expected mass deviation (250).

6. The vibratory flowmeter of claim 5, wherein the fluid density includes at least one of a measured fluid density and an inputted expected fluid density.

7. The vibratory flowmeter of claim 5, with the meter electronics (20) being further configured to compute a difference of expected mass deviation values at the first and second pickoff sensors (170L and 170R), and verify proper operation of the vibratory flowmeter (5) using the computed difference of the expected mass deviation values.

8. The vibratory flowmeter of claim 7, wherein the verify operation of the vibratory flowmeter using the computed difference of the expected mass deviation values includes: to determine a difference between the computed difference of the expected mass deviation mass values and a baseline expected mass deviation difference (255), and wherein the determined difference is compared to a predetermined expected mass deviation difference range (256).

9. The vibratory flowmeter of claim 7, with the meter electronics (20) being further configured to compare the computed difference of the expected mass deviation values to a predetermined expected mass deviation difference range (256), generate a verification indication for the vibratory flowmeter (5) if the computed difference of the expected mass deviation values falls within the predetermined expected mass deviation difference range (256), and generate a non-verification indication for the vibratory flowmeter (5) if the computed difference of the expected mass deviation values does not fall within the predetermined expected mass deviation difference range (256).

10. A meter verification method for a vibratory flowmeter, with the method comprising:
- vibrating a flowmeter assembly of the vibratory flowmeter in a single mode using a driver;
- determining a single mode current of the driver and determining first and second single mode response voltages generated by first and second pickoff sensors, respectively;
- computing frequency response functions for the determined first and second response voltages from the determined single mode current;
- fitting the generated frequency response functions to a pole-residue model to generate a meter mass value (240); and
- verifying proper and accurate operation of the vibratory flowmeter (5) using the meter mass value (240).

11. The meter verification method of claim 10, with the meter electronics (20) further comprising computing a difference of meter mass values at the first and second pickoff sensors (170L and 170R), and verifying proper operation of the vibratory flowmeter (5) using the computed difference of the meter mass values.

12. The meter verification method of claim 11, wherein the verifying operation of the vibratory flowmeter using the computed difference of the meter mass values includes: determining a difference between the computed difference of the meter mass values and a baseline meter mass difference (245), and wherein the determined difference is compared to a predetermined mass difference range (245).

13. The meter verification method of claim 11, with the meter electronics (20) further comprising: comparing the computed difference of the meter mass values to a predetermined mass difference range (245), generating a verification indication for the vibratory flowmeter (5) if the computed difference of the meter mass values falls within the predetermined mass difference range (245), and generating a non-verification indication for the vibratory flowmeter (5) if the computed difference of the meter mass values does not fall within the predetermined mass difference range (245).

14. The meter verification method of claim 10, with the meter electronics (20) further comprising: utilizing a fluid density to compute an expected mass deviation (250) for the first and second pickoff sensors (170L and 170R), and verifying proper operation of the vibratory flowmeter (5) using the expected mass deviation (250).

15. The meter verification method of claim 14, wherein the fluid density includes at least one of a measured fluid density and an inputted expected fluid density.

16. The meter verification method of claim 14, with the meter electronics (20) further comprising: computing a difference of expected mass deviation values at the first and second pickoff sensors (170L and 170R), and verifying proper operation of the vibratory flowmeter (5) using the computed difference of the expected mass deviation values.

17. The meter verification method of claim 16, wherein the verifying operation of the vibratory flowmeter using the computed difference of the expected mass deviation values includes: determining a difference between the computed difference of the expected mass deviation mass values and a baseline expected mass deviation difference (255), and wherein the determined difference is compared to a predetermined expected mass deviation difference range (256).

18. The meter verification method of claim 16, with the meter electronics (20) further comprising: comparing the computed difference of the expected mass deviation values to a predetermined expected mass deviation difference range (256), generating a verification indication for the vibratory flowmeter (5) if the computed difference of the expected mass deviation values falls within the predetermined expected mass deviation difference range (256), and generating a non-verification indication for the vibratory flowmeter (5) if the computed difference of the expected mass deviation values does not fall within the predetermined expected mass deviation difference range (256).

* * * * *